United States Patent [19]

Tsutsumi et al.

[11] Patent Number: 4,868,693
[45] Date of Patent: Sep. 19, 1989

[54] MAGNETIC RECORDING AND/OR REPRODUCING APPARATUS

[75] Inventors: Kazumasu Tsutsumi; Shinji Ohba, both of Hamamatsu, Japan

[73] Assignee: Yamaha Corporation, Hamamatsu, Japan

[21] Appl. No.: 153,338

[22] Filed: Feb. 8, 1988

[30] Foreign Application Priority Data

Feb. 9, 1987 [JP] Japan .................................. 62-27833
Mar. 19, 1987 [JP] Japan .................................. 62-65323
Sep. 10, 1987 [JP] Japan .......................... 62-138754[U]

[51] Int. Cl.$^4$ ...................... G11B 5/027; G11B 15/00
[52] U.S. Cl. ...................................... 360/85; 360/95; 360/96.5
[58] Field of Search ...................... 360/83, 84, 85, 88, 360/90, 93, 95, 96.1, 96.5

[56] References Cited

U.S. PATENT DOCUMENTS

| | | | |
|---|---|---|---|
| 4,639,797 | 1/1987 | Kobayashi et al. | 360/85 X |
| 4,685,009 | 8/1987 | Min et al. | 360/95 |
| 4,752,845 | 6/1988 | Suzuki | 360/95 |
| 4,788,609 | 11/1988 | Yamada et al. | 360/95 X |
| 4,789,912 | 12/1988 | Masuda et al. | 360/95 X |
| 4,792,871 | 12/1988 | Hutter | 360/95 X |

*Primary Examiner*—Robert S. Tupper
*Assistant Examiner*—Andrew L. Sniezek
*Attorney, Agent, or Firm*—Scully, Scott, Murphy & Presser

[57] ABSTRACT

A magnetic recording and/or reproducing apparatus for use with a tape cassette. A pair of tape loading posts are moved respectively by first and second drive gears to draw a portion of a magnetic tape out of the tape cassette to wrap the magnetic tape portion about a head drum. The tape loading posts are drivingly connected respectively to the first and second drive gears through respective lost-motion mechanisms such that subsequent angular movements of the respective first and second drive gears after movement of the tape loading posts to their respective tape loading positions are prevented from being transmitted respectively to the tape loading posts. The first drive gear is provided in its outer periphery with a cut-out. A tape loading gear is in facing relation to the cut-out in the first drive gear until the tape cassette moves to its loading position. After movement of the tape cassette to its loading position, the first drive gear is angularly moved slightly so that it is brought into mesh with the tape loading gear and is driven thereby for angular movement in its tape loading direction.

9 Claims, 19 Drawing Sheets

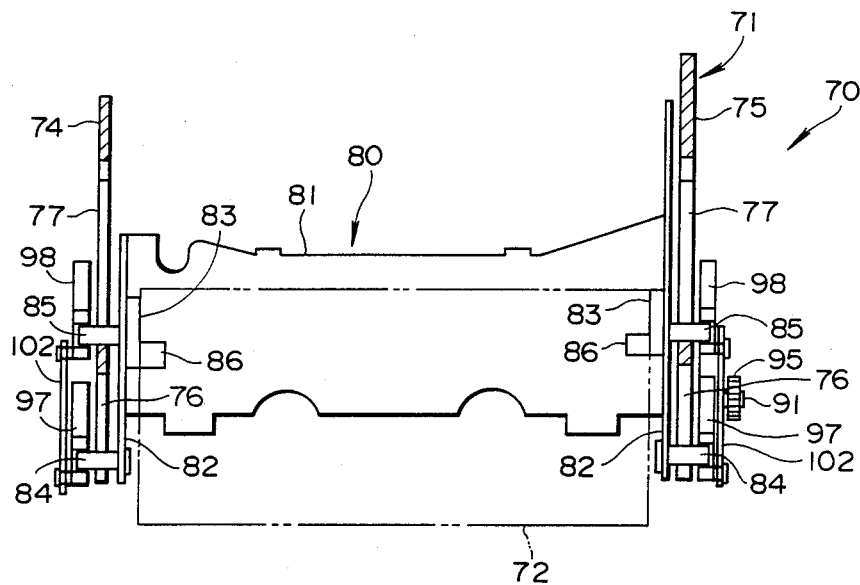
FIG.9
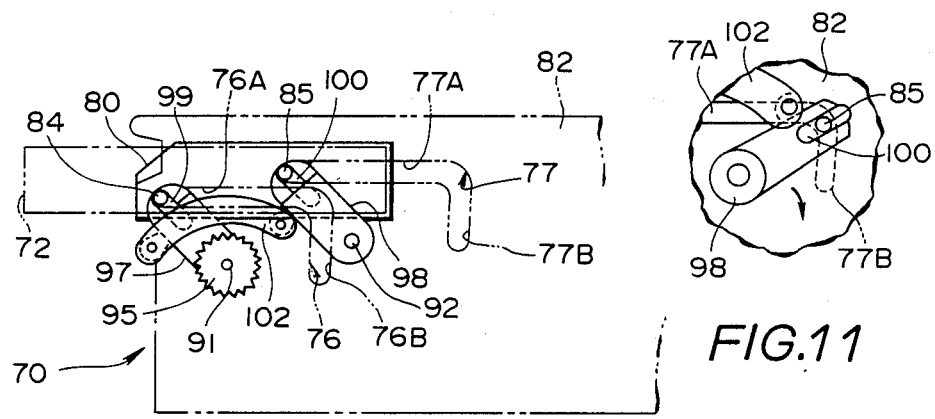
FIG.10
FIG.11

MAGNETIC RECORDING AND/OR REPRODUCING APPARATUS

BACKGROUND OF THE INVENTION

The present invention relates to magnetic recording and/or reproducing apparatuses such as, for example, video tape recorders (VTR), digital audio tape recorders (R-DAT) or the like, for use with tape cassettes each having accommodated therein a magnetic tape.

In a general magnetic recording and/or reproducing apparatus for use with a tape cassette having accommodated therein a magnetic tape, a portion of the magnetic tape is drawn out of the tape cassette and is wrapped about a head drum or rotary head. The magnetic tape is run in wrapping relation to the head 15 drum so that signals are recorded on or reproduced from the magnetic tape.

The magnetic recording and/or reproducing apparatus comprises a tape cassette loading mechanism for moving the tape cassette between a tape cassette unloading position where the tape cassette can be unloaded from the apparatus and a tape cassette loading position where the tape cassette is located at a predetermined position with respect to the head drum. The apparatus further comprises a tape loading mechanism which has a pair of tape loading posts movable between their respective tape unloading positions where the tape loading posts are located on the inside of the magnetic tape portion extending within the tape cassette and respective tape loading positions where the tape loading posts are located remote from the tape cassette to wrap the magnetic tape portion about the head drum. Component parts such as a pinch roller and the like are moved in synchronism with movement of the tape loading posts between the tape loading and unloading positions.

Conventional magnetic recording and/or reproducing apparatuses of the kind referred to above are disclosed, for example, in Japanese Patent Application Laid-Open Nos. 61-204855 and 61-202362.

The apparatus disclosed in Japanese Patent Application Laid-Open No. 61-204855 will be described with reference to FIGS. 1 and 2 of the accompanying drawings. The apparatus comprises a tape cassette holder 1 and a pair of rack plates 2 (only one shown in FIG. 1) which are fixedly mounted respectively to the opposite sides of the tape cassette holder 1. Each of a pair of side wall plates 4 (only one shown in FIG. 1) fixedly secured to a chassis 3 is arranged on the outside of a corresponding one of the rack plates 2. Each of the side wall plates 4 is formed therein with three guide slots 5a, 5b and 5c. Three follower pins 6a, 6b and 6c are attached to each of the rack plate 2 and are slidably fitted respectively in the three guide slots 5a, 5b and 5c. Each of the rack plates 2 is provided therein with an opening 7, and rack gear teeth 8 are formed along a side edge of the opening 7. In mesh with the rack gear teeth 8 is a pinion 9 which is adapted to be driven for rotation by a tape cassette loading motor (not shown).

In the illustrated apparatus, a tape cassette 10 is mounted on the tape cassette holder 1 as indicated by the dot-and-dash lines in FIG. 1. When the tape cassette 10 is mounted on the tape cassette holder 1 as shown in FIG. 1, the tape cassette loading motor is driven to rotate the pinion 9 thereby moving the rack plates 2 and the tape cassette holder 1 from a position indicated by the dot-and-dash lines to a position indicated by the solid and broken lines, along the configuration of the guide slots 5a, 5b and 5c. When the tape cassette holder 1 is moved to the position indicated by the solid and broken lines, the tape cassette 10 is located at its tape cassette loading position within the apparatus, as shown in FIG. 2. As the tape cassette 10 is located at the tape cassette loading position, a tape loading motor (not shown) is driven to move a pair of tape loading posts 12 (only one shown in FIG. 2) to the left as viewed in FIG. 2 thereby drawing a portion 11 of a magnetic tape out of the tape cassette 10. The drawn magnetic tape portion 11 is wrapped about a head drum (not shown). The magnetic tape portion 11 is run in wrapping relation to the head drum so that signals are recorded on or reproduced from the magnetic tape.

FIGS. 3 through 5 show the magnetic recording and/or reproducing apparatus disclosed in the above-mentioned Japanese Patent Application Laid-Open No. 61-202362. The apparatus comprises a chassis 15 which is formed therein with an opening 16 and a pair of guide slots 17a and 17b. A supply reel mount 18a and a take-up reel mount 18b are arranged within the opening 16. A head drum 20 is mounted on the chassis 15 at a location between the guide slots 17a and 17b. A pair of movable blocks 21a and 21b are fitted respectively in the guide slots 17a and 17b for sliding movement therealong. A pair of tape loading posts 22a and 22b are fixedly mounted respectively to the movable blocks 21a and 21b.

As best shown in FIG. 5, a pair of loading rings 23 and 24 are rotatably arranged on the side of a lower surface of the chassis 15 in surrounding relation to the head drum 20. These loading rings 23 and 24 are drivingly connected to a loading motor 25 through a gear train 26 such that the loading rings 23 and 24 are angularly moved by the motor 25 in their respective directions opposite to each other.

The loading ring 23 is connected to the movable block 21b through a connecting arm 27a, while the loading ring 24 are connected to the movable block 21a through a connecting arm 27b. The loading ring 23 has mounted thereto a pinch roller arm pusher 28 on which a guide post pusher 29 is supported.

A pinch roller arm 31 is pivotally mounted on a pivot 30 fixed to the chassis 15. The pinch roller arm 31 has a free end thereof on which a pinch roller 32 is rotatably mounted through a support shaft 33. When the pinch roller arm 31 angularly moves about the pivot 30, the pinch roller 32 moves toward and away from a capstan 34. A support arm 36 is pivotally mounted on a pivot 35 fixed to the chassis 15. The support arm has a free end thereof on which a movable guide post 37 is mounted.

A tape cassette 38 having accommodated therein a magnetic tape 39 is adapted to be loaded in the apparatus at a position indicated by the two-dot-and-dash lines in FIGS. 3 and 4. FIG. 3 shows a tape unloading position before a portion of the magnetic tape 39 is drawn out of the tape cassette 38. In this tape unloading position, the tape loading posts 22a and 22b, the pinch roller 32 and the movable guide post 37 are located on the inside of the magnetic tape portion extending along the front edge of the tape cassette 38. As the loading motor 25 is driven for rotation, the loading ring 23 is angularly moved in the counterclockwise direction as viewed in FIG. 3, while the loading ring 24 is angularly moved in the clockwise direction. By such angular movements of the respective loading rings 23 and 24, the movable blocks 21a and 21b as well as the tape loading posts 22a and 22b are moved along the respective guide slots 17a and 17b rearwardly, i.e., upwardly as viewed in FIG. 3. As the loading ring 23 is angularly moved through a predetermined angle, the pusher 28 is abutted against the support shaft 33 and the pusher 29 is abutted against the movable guide post 37, to thereby cause the pinch roller 32 and the movable guide post 37 to angularly move respectively the pinch roller arm 31 and the support arm 36 in the clockwise direction about their respective pivots 30 and 35. As the tape loading posts 22a and 22b, the pinch roller 32 and the movable guide post 37 are moved rearwardly, the magnetic tape portion is drawn by these component parts out of the tape cassette 38, and the drawn magnetic tape portion is wrapped about the head drum 20. At this time, the pinch roller 32 urges the magnetic tape portion against the capstan 34. FIG. 4 shows a state in which the magnetic tape portion is moved to the tape loading position. In this state, if a play command is given, the capstan 34 and the head drum 20 are rotated to enable signals to be recorded on or reproduced from the magnetic tape 39.

In the apparatus described above with reference to FIGS. 3 through 5, the tape drive arrangement is such that the pair of loading rings 23 and 24 are employed to drive the tape loading posts 22a and 22b, the pinch roller 32 and the movable guide post 37. Accordingly, in the tape drive arrangement, the pair of loading rings 23 and 24 cannot but be arranged so as to surround the head drum 20. Thus, the tape drive arrangement cannot be said rational from the space point of view, and it is difficult for such tape drive arrangement to simplify the construction of the apparatus, to reduce the weight of the apparatus, and to reduce the overall size or dimension of the apparatus.

In order to dissolve the above-described problems of the apparatus disclosed in Japanese Patent Application Laid-Open No. 61-202362, a tape drive arrangement shown in FIG. 6 has been proposed in Japanese Patent Application Laid-Open No. 58-147836.

FIG. 6 is a bottom view of a magnetic recording and/or reproducing apparatus which comprises a base plate 40 and a head drum 41 mounted on the base plate 40.

The base plate 40 is formed therein with a pair of guide slots 42 and 43 on either side of the head drum 41. Fitted respectively in the guide slots 42 and 43 are a pair of tape drawing members 46 and 47 on which a pair of tape loading posts 44 and 45 are mounted respectively. A pair of drive gears 48 and 49 in mesh with each other are mounted on a lower surface of the base plate 40 through respective support shafts 50 and 51. The drive gears 48 and 49 are provided with their respective projections 52 and 53. A small-diameter gear 54 is mounted to the drive gear 49 for rotation therewith about a common axis. The projection 52 is connected to the tape drawing member 46 through a link 55, while the projection 53 is connected to the tape drawing member 47 through a link 56. In addition, a geared arm 58 formed with gear teeth 58A is mounted to the lower surface of the base plate 40 through a pivot 57 such that the gear teeth 58A on the geared arm 58 are in mesh with the gear 54.

A pinch roller 60 is provided which is movable toward and away from a capstan 59.

Rotational force of a loading motor 62 is transmitted to the geared arm 58 through a rotary member 63, a cam 64 and a sector gear 65. Driving force of the cam 64 is transmitted to the pinch roller 60 through a rod 66 and a linkage 67.

FIG. 6 shows an unloading state before a portion of a magnetic tape (not shown) is drawn out of a tape cassette (not shown). In this unloading state, the tape loading posts 44 and 45 are located on the inside of the magnetic tape portion extending within the tape cassette. As the loading motor 62 is driven for rotation, the geared arm 58 is angularly moved about the support shaft 57 in the clockwise direction indicated by the arrow in FIG. 6 so that the drive gear 49 is angularly moved in the counterclockwise direction and the drive gear 48 is angularly moved in the clockwise direction. By such angular movements of the respective drive gears 48 and 49, their respective projections 52 and 53 cause the respective tape drawing members 46 and 47 to be moved rearwardly. The tape loading posts 44 and 45 draw the magnetic tape portion out of the tape cassette to wrap the magnetic tape portion about the head drum 41. The pinch roller 60 urges the drawn magnetic tape portion against, the capstan 59. Thus, signals can be recorded on or reproduced from the magnetic tape.

According to the tape drive arrangement described above with reference to FIG. 6, component parts for driving the tape loading posts 44 and 45 can be collected together on one side of the head drum 41, making it possible to achieve simplification of the construction of the apparatus, and reduction in weight and size or dimension of the apparatus.

In the tape drive arrangement illustrated in FIG. 6, there are a state or stop mode in which the tape loading posts 44 and 45 are moved to their respective tape loading positions, but the pinch roller 60 is not yet urged against the capstan 59, and a state or play mode in which the pinch roller 60 is moved from the stop mode position to a position where the pinch roller 60 is urged against the capstan 59. In the tape drive arrangement illustrated in FIG. 6, it may be considered to drive the pinch roller 60 by the drive mechanism for the tape loading posts 44 and 45 when switching is effected between the play mode and the stop mode. If it is possible to drive the pinch roller 60 by the drive mechanism for the tape loading posts 44 and 45, the apparatus would be simplified in construction. However, it is impossible for the arrangement of the apparatus illustrated in FIG. 6 to drive the pinch roller 60 directly by the drive mechanism for the tape loading posts 44 and 45, which comprises the drive gears 48 and 49, the gear 54, the geared arm 58 and the sector gear 65.

That is to say, in the apparatus illustrated in FIG. 6, the geared arm 58 for angularly moving the drive gears 48 and 49 cannot but be so arranged as to project from the gear 54 away from the head drum 41. For such arrangement, the geared arm 58 can only be swung to the right and left so that the angularly moving extent of the geared arm 58 is extremely limited. In addition, since the drive gears 48 and 49 are also in mesh with the geared arm 58, the angularly moving extents of the respective drive gears 48 and 49 are limited. Moreover, since these drive gears 48 and 49 are provided respectively with the projections 52 and 53, the drive gears 48 and 49 cannot be angularly moved in excess of 180 degrees. In this manner, in the arrangement illustrated in FIG. 6, the angularly moving extents of the respective drive gears 48 and 49 and geared arm 58 are limited, and it is impossible to further angularly move the drive gears 48 and 49 and the geared arm 58 after the tape loading posts 44 and 45 are moved to their respective tape loading positions. Thus, it is impossible for the arrangement to drive the pinch roller 60 by the drive mechanism for the tape loading posts 44 and 45.

Furthermore, each of the apparatus illustrated in FIGS. 1 and 2 and the apparatus illustrated in FIGS. 3 through 5 is so arranged as to comprise a tape cassette loading motor for loading the tape cassette, and a separate, tape loading motor for loading the magnetic tape. That is, each of the apparatuses necessitates provision of two separate loading motors. This raises the cost of the apparatuses. In addition, the space factor is low so that an attempt cannot be made to reduce the overall size or dimension of the apparatuses.

Moreover, as described above with reference to FIG. 1, the conventional tape cassette loading mechanism includes three guide slots in each of the opposite side wall plates. This increases the height dimension of the tape cassette loading mechanism, making it difficult to achieve reduction in overall dimension of the apparatus. That is, it is difficult to make the apparatus compact in construction. In addition, assembling operation is troublesome, because the three follower pins projecting from each side of the tape cassette holder are required to be fitted simultaneously into the respective guide slots in the corresponding side wall plate.

SUMMARY OF THE INVENTION

It is an object of the invention to provide a magnetic recording and/or reproducing apparatus in which a pair of drive gears for driving respectively a pair of tape loading posts can also be utilized for another purposes.

It is another object of the invention to provide a magnetic recording and/or reproducing apparatus in which loading of a tape cassette and loading of a magnetic tape can be effected by a single common drive source.

It is still another object of the invention to provide a magnetic recording and/or reproducing apparatus in which only two guide slots formed in each of a pair of fixed side walls are utilized to load a tape cassette in a smooth manner so that a mechanism can be made compact and can be simplified in construction, and assembling operation can be made easy.

According to the invention, there is provided a magnetic recording and/or reproducing apparatus for use with a tape cassette having accommodated therein a magnetic tape, the apparatus comprising:
- a head drum having mounted thereon at least one magnetic head;
- a pair of first and second tape loading post means movable between their respective tape unloading positions where the first and second tape loading post means are located within the tape cassette and respective tape loading positions where the first and second tape loading post means are located remote from the tape cassette, the first and second tape loading post means drawing a portion of the magnetic tape out of the tape cassette when the first and second tape loading post means move from their respective tape unloading positions to their respective tape loading positions, the magnetic tape portion being wrapped about the head drum by a predetermined wrapping angle when the first and second tape loading post means move to their respective tape loading positions;
- a pair of first and second drive gear means in mesh with each other, the first drive gear means being angularly movable about its axis in tape loading and unloading directions opposite to each other, and the second drive gear means being angularly movable about its axis in tape loading and unloading directions opposite to each other;
- means for driving the first and second drive gear means to angularly move them about their respective axes in the tape loading and unloading directions;
- a pair of first and second linkage means having their respective one ends connected respectively to the first and second tape loading post means, the first linkage means extending between the first tape loading post means and the first drive gear means for transmitting angular movement of the first drive gear means to the first tape loading post means to move the same between its tape unloading and loading positions, the second linkage means extending between the second tape loading post means and the second drive gear means for transmitting angular movement of the second drive gear means to the second tape loading post means to move the same between its tape unloading and loading positions; and
- a pair of first and second lost-motion means through which the other ends of the respective first and second linkage means are connected respectively to the first and second drive gear means,
- wherein the first lost-motion means enables angular movement of the first drive gear means in its tape loading direction to be transmitted to the first tape loading post means through the first linkage means until the first tape loading post means moves to its tape loading position, while the first lost-motion means prevents subsequent angular movement of the first drive gear means in its tape loading direction after movement of the first tape loading post means to its tape loading position, from being transmitted to the first tape loading post means through the first linkage means, and
- wherein the second lost-motion means enables angular movement of the second drive gear means in its tape loading direction to be transmitted to the second tape loading post means through the second linkage means until the second tape loading post means moves to its tape loading position, while the second lost-motion means prevents subsequent angular movement of the second drive gear means in its tape loading direction after movement of the second tape loading post means to its tape loading position, from being transmitted to the second tape loading post means through the second linkage means.

According to the invention, there is further provided a magnetic recording and/or reproducing apparatus for use with a tape cassette having accommodated therein a magnetic tape, the apparatus comprising:
- a head drum having mounted thereon at least one magnetic head;
- tape cassette loading means including a slider mounted for linear movement in tape cassette loading and unloading directions opposite to each other, the slider being formed thereon with rack gear teeth, linear movement of the slider in the tape cassette loading and unloading directions moving the tape cassette between a tape cassette loading position where the tape cassette is located at a predetermined position with respect to the head drum and a tape cassette unloading position where the tape cassette can be unloaded from the apparatus;

tape loading means including drive gear means mounted for angular movement about its axis in tape loading and unloading directions opposite to each other, the drive gear means being provided in an outer periphery thereof with a cut-out at which gear teeth on the drive gear means are partially cut out, angular movement of the drive gear means in its tape loading and unloading directions moving a portion of the magnetic tape between a tape unloading position where the magnetic tape portion extends within the tape cassette and a tape loading position where the magnetic tape portion is wrapped about the head drum by a predetermined wrapping angle;

tape loading gear means mounted for angular movement about its axis in tape loading and unloading directions opposite to each other, the tape loading gear means being arranged in facing relation to the cut-out in the drive gear means when the magnetic tape portion is in its tape unloading position;

tape cassette loading gear means mounted for angular movement about its axis in tape cassette loading and unloading directions opposite to each other, the tape cassette loading gear means being in mesh with the rack gear teeth on the slider for linearly moving the same in its tape cassette loading and unloading directions, the tape cassette loading gear means being provided on an end face thereof with cam means;

drive means for driving the tape loading gear means and the tape cassette loading gear means to angularly move them in their respective tape loading and unloading directions and tape cassette loading and unloading directions; and cam follower means having one end thereof in engagement with the cam means and the other end engageable with the drive gear means, wherein as the tape loading gear means and the tape cassette loading gear means are angularly moved in their respective tape loading direction and tape cassette loading direction by the drive means, after the tape cassette loading gear means is angularly moved in its tape cassette loading direction through a predetermined angle to cause the slider to move the tape cassette to its tape cassette loading position, subsequent angular movement of the tape cassette loading gear means in its tape cassette loading direction causes the cam means to bring the other end of the cam follower means into engagement with the drive gear means to angularly move the same in its tape loading direction through a predetermined angle thereby bringing the gear teeth on the drive gear means into mesh with the tape loading gear means to cause the same to angularly move the drive gear means in its tape loading direction.

According to the invention, there is still further provided a magnetic recording and/or reproducing apparatus for use with a tape cassette having accommodated therein a magnetic tape, the apparatus comprising:

a pair of first and second fixed side walls arranged in parallel spaced relation to each other, each of the first and second fixed side walls having associated therewith a pair of guide rails extending in parallel relation to each other, each of the guide rails having a first section extending substantially horizontally and a second section continuous to the first section and extending downwardly from the first section at an angle with respect thereto;

a tape cassette holder for holding thereon the tape cassette and arranged between th first and second fixed side walls for movement relative thereto between tape cassette loading and unloading positions, the tape cassette holder having first and second pairs of follower projections, the first pair of follower projections being movable respectively along the pair of guide rails associated with the first fixed side wall, and the second pair of follower projections being movable respectively along the pair of guide rails associated with the second fixed side wall;

first and second pairs of pivoting members pivotally mounted respectively to the first and second fixed side walls, the first pair of pivoting members being provided therein with respective grooves in which the first pair of follower projections are slidably fitted respectively, and the second pair of pivoting members being provided therein with respective grooves in which the second pair of follower projections are slidably fitted respectively, the first pair of pivoting members being pivotally movable about their respective pivotal axes in such a manner that, during pivotal movement of the first pair of pivoting members, their respective grooves are maintained in crossing relation respectively to the pair of guide rails associated with the first fixed side wall, and the second pair of pivoting members being pivotally movable about their respective pivotal axes in such a manner that, during pivotal movement of the second pair of pivoting members, their respective grooves are maintained in crossing relation respectively to the pair of guide rails associated with the second fixed side wall;

a pair of first and second connecting links, the first connecting link having opposite ends thereof pivotally connected respectively to the first pair of pivoting members to enable them to pivotally move in parallel relation to each other, and the second connecting link having opposite ends thereof pivotally connected respectively to the second pair of pivoting members to enable them to pivotally move in parallel relation to each other; and drive means for driving the first and second pairs of pivoting members to pivotally move them for moving the first and second pairs of follower projections respectively along the pairs of guide rails associated respectively with the first and second fixed side walls, thereby moving the tape cassette holder between the tape cassette loading and unloading positions.

BRIEF DESCRIPTION OF THE DRAWINGS

FIG. 9 is a horizontal cross-sectional view of the tape cassette loading mechanism illustrated in FIG. 8;

FIG. 10 is a side elevational view of the tape cassette loading mechanism illustrated in FIG. 8;

FIG. 11 is a fragmental view for explanation of the relationship among a pivoting arm, a follower pin and a guide slot in the arrangement illustrated in FIG. 10;

DETAILED DESCRIPTION

The invention will be described below in detail, by way of mere example, with reference to FIGS. through 20a to 20d.

Figure 7:
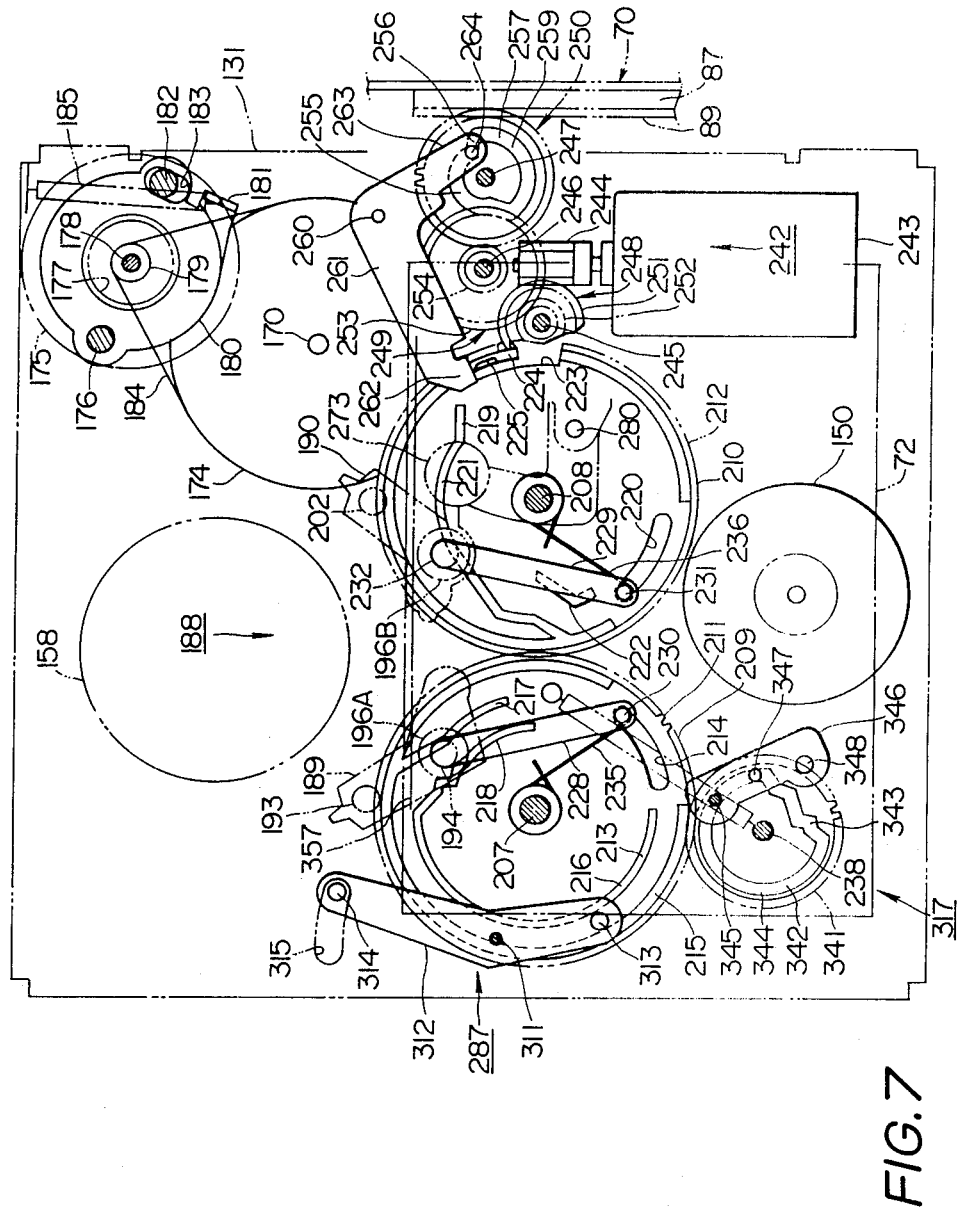
FIG. 7 is a top plan view of a magnetic recording and/or reproducing apparatus according to an embodiment of the invention.
Figure 12:
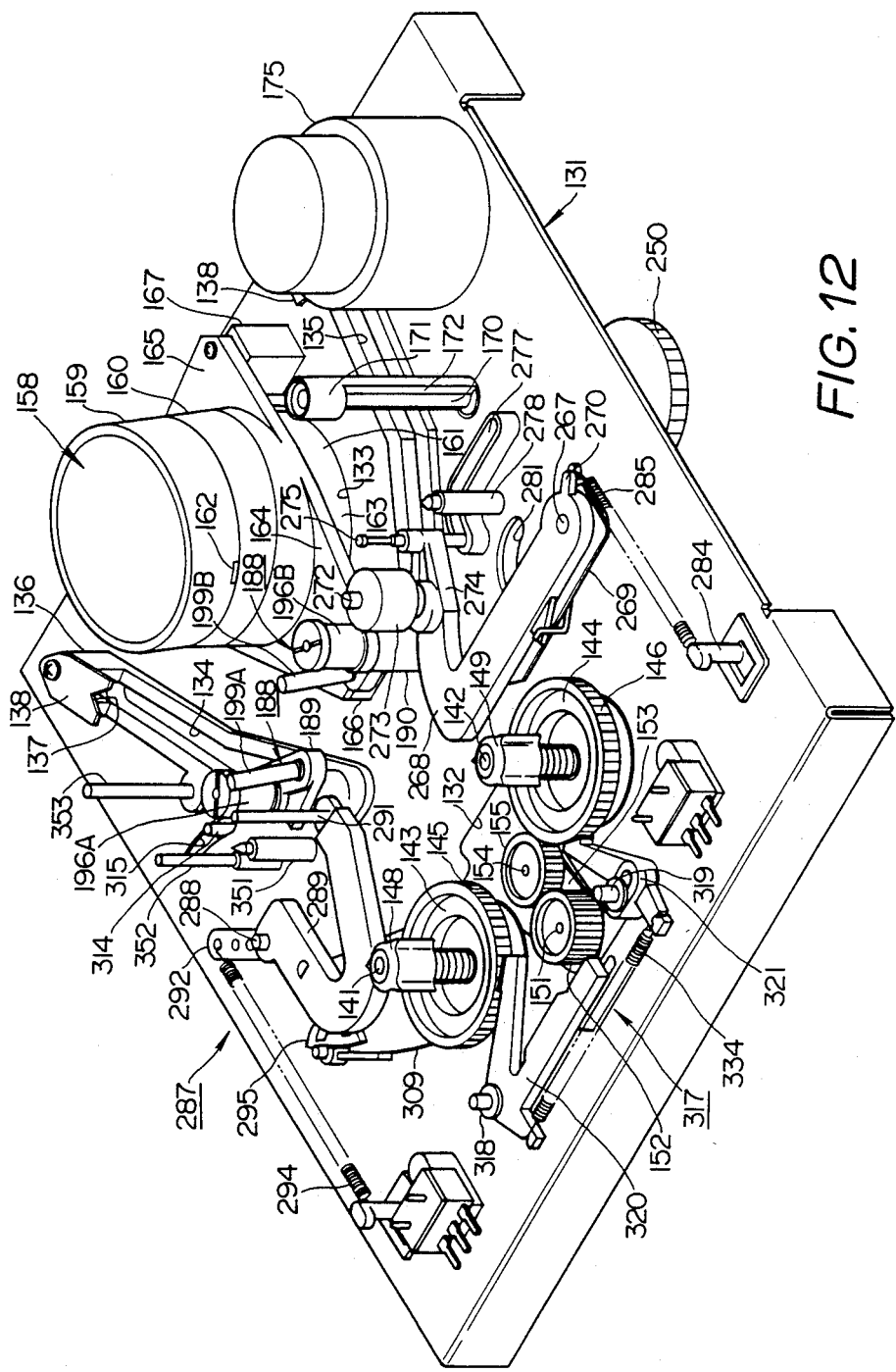
FIG. 12 is a perspective view showing principal component parts illustrated in FIG. 8.
Figure 13:
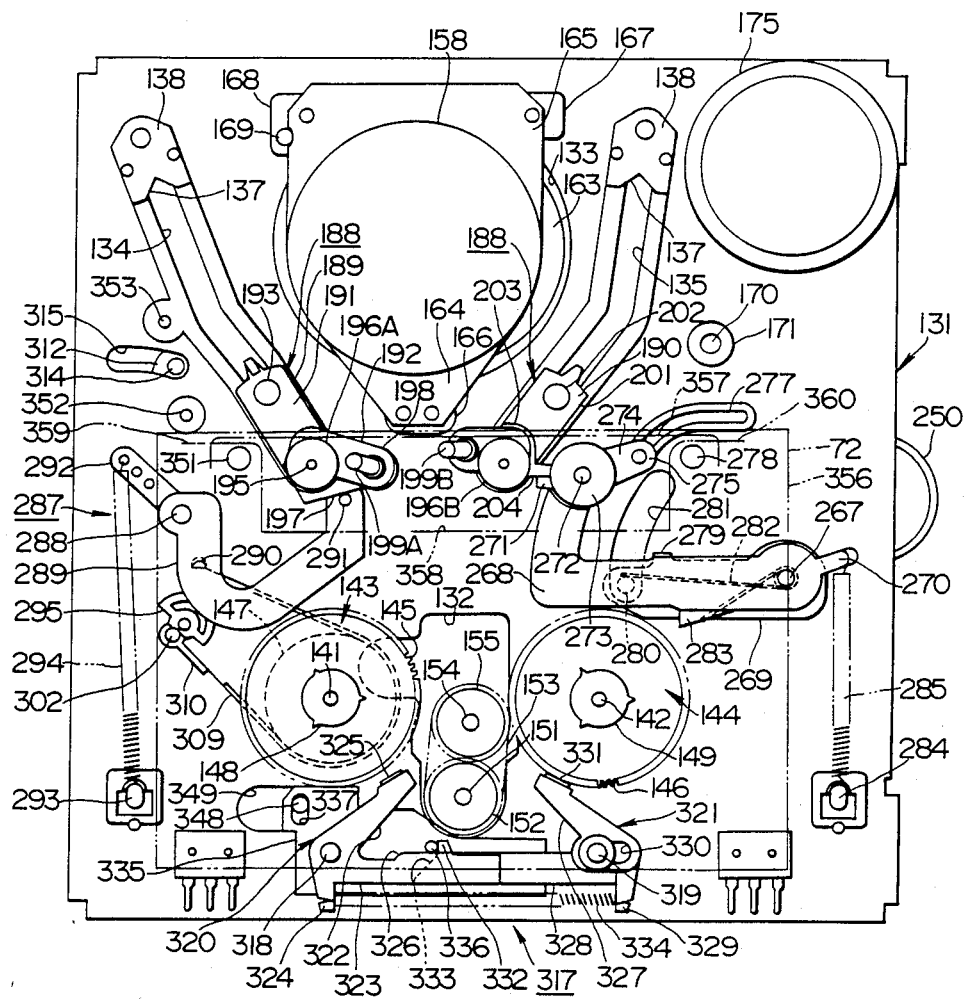
FIG. 13 is a top plan view of the component parts illustrated in FIG. 12.
Figure 14:
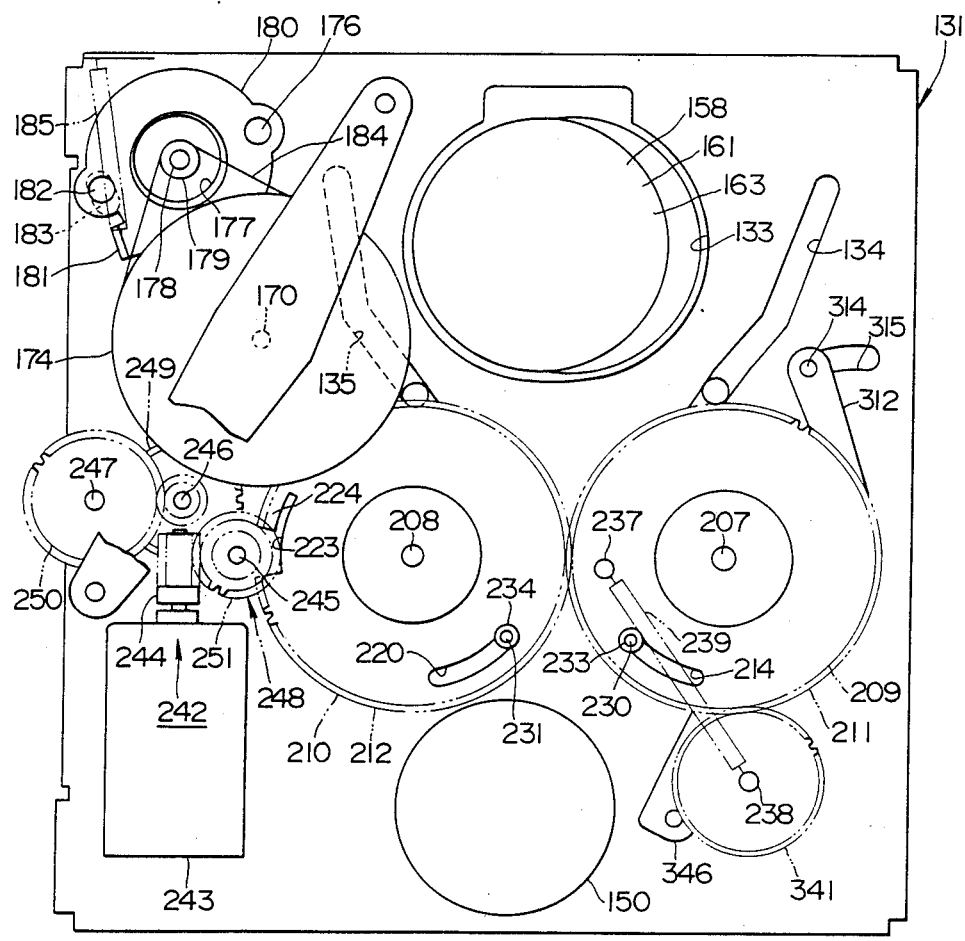
FIG. 14 is a bottom view of the arrangement illustrated in FIG. 13.

FIGS. 7 through 20a to 20d show arrangement and operation of a magnetic recording and/or reproducing apparatus according to an embodiment of the invention. The description will be made on the arrangement and operation of the apparatus, which are divided under the following heads:

A. TAPE CASSETTE LOADING MECHANISM (FIGS. 8 through 11);
B. CHASSIS (FIGS. 12 through 14);
C. REEL MOUNTS (FIGS. 12 through 14);
D. HEAD DRUM (FIGS. 12 through 14);
E. CAPSTAN (FIGS. 7 and 12 through 14);
F. TAPE LOADING MECHANISM;
   F-1: MOVABLE BLOCKS (FIGS. 7 and 12 through 15), and
   F-2: DRIVE GEARS (FIGS. 7 and 14)
G. LOADING SWITCHING MECHANISM (FIGS. 7 and 14);
H. OPERATION OF LOADING SWITCHING MECHANISM (FIGS. 19a through 19c);
I. PINCH ROLLER (FIGS. 12, 13 and 16);
J. TAPE TENSIONING MECHANISM (FIGS. 7, 13, 17 and 18);
K. BRAKE MECHANISM (FIGS. 7 and 12 through 14);
L. OTHER ARRANGEMENT. (FIGS. 12 and 13); and
M. OPERATION OF APPARATUS (FIGS. 8 through 11, 13, 16, 19a through 19c and 20a through 20d).

A. TAPE CASSETTE LOADING MECHANISM (FIGS. 8 through 11)

Figure 8:
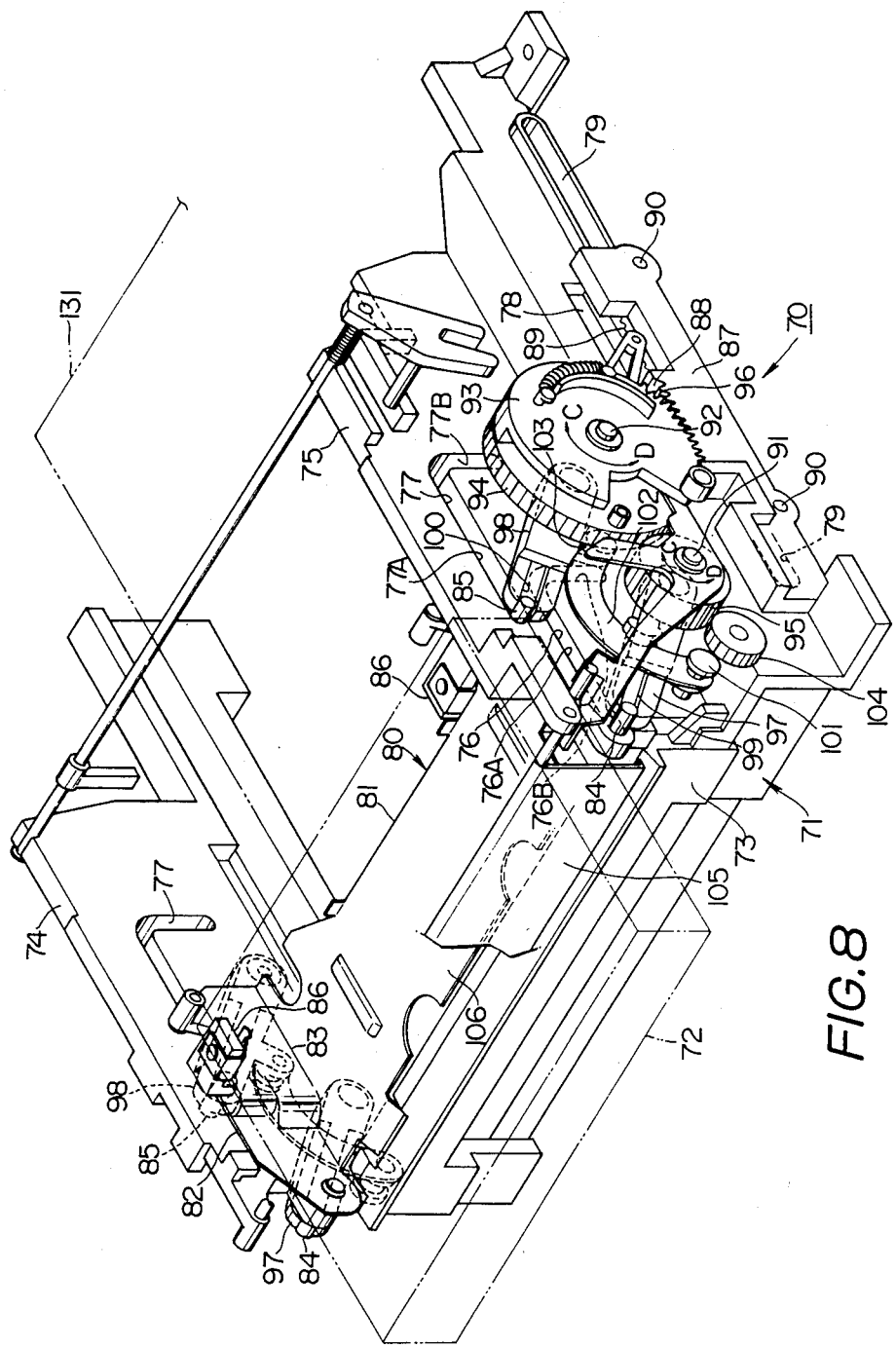
FIG. 8 is a perspective view showing a tape cassette loading mechanism of the apparatus illustrated in FIG. 7.

In FIGS. 8 through 10, a tape cassette loading mechanism is generally designated by the reference numeral 70. The tape cassette loading mechanism 70 comprises various component parts for moving a tape cassette 72 between a tape cassette unloading position where the tape cassette 72 can be removed from the apparatus and a tape cassette loading position where the tape cassette 72 is located at a predetermined position with respect to a head drum 158. These component parts for moving the tape cassette 72 between the tape cassette unloading and loading positions are mounted to a frame 71 fixedly attached to a chassis 131 which will be described later in detail.

The frame 71 is a member of a U-shaped cross-section and is integrally formed to have a front wall 73 and a pair of side walls 74 and 75 spaced in parallel relation to each other. Each of the side walls 74 and 75 is provided at its upper portion with a pair of L-shaped guide slots 76 and 77 serving as guide rails extending in parallel relation to each other. The guide slot 76 is composed of a horizontal section 76A and a vertical section 76B continuous to the horizontal section 76A and extending at right angles thereto. Likewise, the guide slot 77 is composed of a horizontal section 77A and a vertical section 77B continuous to the horizontal section 77A and extending at right angles thereto. Each pair of guide slots 76 and 77 are arranged such that their respective vertical sections 76B and 77B are relatively remote from each other, but their respective horizontal sections 76A and 77A are close to each other. The side wall 75 is formed at its lower portion with an opening 78 and a pair of slider guide slots 79 and 79.

A tape cassette holder 80 is supported within the frame 71 for movement relative thereto. The tape cassette holder 80 comprises a plate-like member which is bent to form a bottom wall 81 and a pair of side walls 82 and 82 extending upwardly at right angles to the bottom wall 81. A pair of side plates 83 and 83 are fixedly mounted respectively to inner surfaces of the respective side walls 82 and 82. A pair of follower pins 84 and 85 are fixed to each of the side walls 82 so as to project laterally from an outer surface of the side wall 82. A pair of tape cassette retainers 86 and 86 are mounted respectively to upper portions of the respective side plates 83 and 83. The tape cassette holder 80 is supported on the frame 71 in such a manner that the pair of follower pins 84 and 85 on each side of the tape cassette holder 80 are slidably fitted respectively in the pair of guide slots 76 and 77 formed in a corresponding one of the side walls 74 and 75. The tape cassette holder 80 moves horizontally during movement of the follower pins 84 and 85 respectively along the horizontal sections 76A and 77A of the respective guide slots 76 and 77, and moves vertically during movement of the follower pins 84 and 85 respectively along the vertical sections 76B and 77B of the respective guide slots 76 and 77.

A slider 87 is supported at a lower portion of the side wall 75 and on the outside thereof. The slider 87 is a plate-like member and has an upper surface and an inner surface which are formed respectively with rack gear teeth 88 and 89. A pair of pins 90 and 90 are fixedly mounted to the slider 87 and extend laterally from the inner surface thereof. The slider 87 are mounted to the side wall 75 in such a manner that the pins 90 and 90 are slidably fitted respectively into the slider guide slots 79 and 79. The slider 87 is linearly movable along the guide slots 79 and 79 within an extent within which the pins 90 and 90 are movable along the respective guide slots 79 and 79.

A pair of support shafts 91 and 92 are fixedly mounted to the side wall 75 and extend laterally from the outer surface thereof. A rotary member 93 and a main gear 94 are rotatably mounted on the support shaft 92. A gear 95 is rotatably mounted on the support shaft 91 and is in mesh with the main gear 94. Gear teeth 96 are formed on a part of a circumferential surface of the rotary member 93. The gear teeth 96 on the rotary member 93 and the main gear 94 are in mesh with the rack gear teeth 88 on the slider 87. The main gear 94 and the rotary member 93 are so arranged as to rotate together.

A pair of arm-like pivoting members 97 and 98 are mounted for angular movement respectively on the support shafts 91 and 92. The pivoting members 97 and 98 have therein respective grooves 99 and 100. The pivoting members 97 and 98 are mounted on the respective support shafts 91 and 92 in such a manner that the follower pins 84 and 85 are fitted respectively in the grooves 99 and 100. The pivoting member 97 is so arranged as to angularly move together with the gear 95. An arcuate link 102 has one end thereof pivotally connected to the pivoting member 97 through a pin 101, and the other end pivotally connected to the pivoting member 98 through a pin 103. The pair of pivoting members 97 and 98 equal in length to each other, the link 102 and the pair of follower pins 84 and 85 cooperate with each other to form a parallelogrammatic linkage so that the pair of pivoting members 97 and 98 are interlocked with each other. Thus, as the gear 95 is angularly moved to angularly move the pivoting member 97 in one direction about the support shaft 91, the angular movement of the pivoting member 97 is transmitted to the pivoting member 98 through the link 102 so that the pivoting member 98 is also angularly moved in parallel relation to the pivoting member 97. During angular movement of the pivoting members 97 and 98, their respective grooves 99 and 100 are maintained in crossing relation to the respective guide slots 76 and 77.

Another pair of pivoting members 97 and 98 are also arranged on the side of the side wall 74 in symmetrical relation to the pivoting members 97 and 98 arranged on the side of the side wall 75. Angular movement of the gear 95 is transmitted, through a driving force transmitting mechanism including a gear 104 in mesh with the gear 95, to the pivoting members 97 and 98 on the side of the side wall 74 so that the pivoting members 97 and 98 on the side of the side wall 74 are angularly moved in a manner like the pivoting members 97 and 98 on the side of the side wall 75.

As the slider 87 is linearly moved along the slider guide slots 79 and 79, the main gear 94 is angularly moved to angularly move the gear 95. As the gear 95 is angularly moved, the pivoting members 97 and 98 connected to each other through the link 102 are angularly moved about the respective support shafts 91 and 92, so that the follower pins 84 and 85 are moved along the respective guide slots 76 and 77 while moving along the respective grooves 99 and 100 in the pivoting members 97 and 98. Thus, the tape cassette holder 80 moves between the tape cassette loading and unloading positions, in accordance with the configuration of the slider guide slots 76 and 77. During movement of the tape cassette holder 80 between the tape cassette loading and unloading positions, the follower pins 84 and 85 are restricted in their respective movements by the respective guide slots 76 and 77 and by the respective grooves 99 and 100 in the pivoting members 97 and 98, which grooves extend in crossing relation to the respective guide slots 76 and 77. The same can be said also to the pivoting members 97 and 98 associated with the side wall 74. Accordingly, as shown in FIG. 11, even when the follower pin 85 reaches a turning point between the horizontal and vertical sections 77A and 77B, the follower pin 85 is restricted in its movement by the guide slot 74 and the groove 100 so that the follower pin 85 does not become a dead point. The same can be said also to the follower pin 84. Thus, the tape cassette holder 80 can smoothly be moved between the tape cassette loading and unloading positions.

As shown in FIG. 8, a closure member 105 is pivotally mounted to the forward ends of the respective side walls 74 and 75, for opening and closing an opening 106 through which the tape cassette 72 is inserted into and taken out of the apparatus. The closure member 105 is movable in synchronism with angular movement of the pivoting members 97 and 98 to open and close the opening 106.

In the illustrated embodiment, the pivoting members 97 and 98 are angularly movable about their respective pivotal axes, that is, the respective support shafts 91 and 92 which are located below the horizontal section 76A of the guide slot 76. However, the pivotal axes of the respective pivoting members 97 and 98 may be arranged at any desired locations other than the above, provided that the grooves 99 and 100 are intersected with the respective guide slots 76 and 77 when the follower pins 84 and 85 pass through the respective turning points between the horizontal and vertical sections of the respective guide slots 76 and 77. If the pivoting members 97 and 98 are arranged as is in the illustrated embodiment, they can most be shortened in length.

B. CHASSIS (FIGS. 12 through 14)

In FIG. 12, let it be supposed for convenience that the chassis 131 has a forward end at the lower left, a rearward end at the upper right, a right side at the lower right, and a left side at the upper left. The chassis 131 is formed adjacent the forward end with an opening 132, and adjacent the rearward end with an attaching bore 133 for the head drum 158. In addition, the chassis 131 is provided therein with a pair of guide slots 134 and 135 which extend from respective locations in front of the attaching bore 133 to respective locations on both sides of the attaching bore 133 as best shown in FIG. 13. A pair of upwardly projecting walls 136 (only one shown in FIG. 12) are outsert-formed respectively at rearward ends of the respective guide slots 134 and 135. A pair of rail portions outsert-formed like the projecting walls 136 extend respectively along the opposite side edges of each of the guide slots 134 and 135. A pair of metallic positioning plates 138 and 138 each having at its forward edge a V-shaped groove 137 are fixedly mounted respectively to top surfaces of the respective projecting walls 136.

C. REEL MOUNTS (FIGS. 12 through 14)

A pair of vertically extending support shafts 141 and 142 are arranged respectively on the left and right sides of the opening 132 in the chassis 131. A pair of reel mounts 143 and 144 are rotatably mounted respectively on the support shafts 141 and 142. The reel mount 143 serves as a supply reel mount, while the reel mount 144 serves as a take-up reel mount. The reel mounts 143 and 144 are formed on their respective circumferential surfaces with gear teeth 145 and 146. The reel mount 143 has at its lower section a drum portion 147 for use to apply tape tension subsequently to be described. A reel engaging shaft 148 is mounted on a portion of the support shaft 141 which extends upwardly from an upper surface of the reel mount 143. Likewise, a reel engaging shaft 149 is mounted on a portion of the support shaft 142 which extends upwardly from an upper surface of the reel mount 144. The reel engaging shafts 148 and 149 are engageable respectively with a pair of tape reels within the tape cassette 72 to rotate the tape reels.

A motor 150 (see FIG. 14) for driving the reel mounts 143 and 144 is mounted to a lower surface of the chassis 131 at a location adjacent the forward edge of the opening 132. The motor 150 has an output shaft 151 which extends upwardly from the opening 132, and a gear 152 is mounted to the upper end of the output shaft 151 for rotation therewith. A gear mounting plate 153 has one end thereof which is mounted on the output shaft 151 such that the gear mounting plate 153 is angularly movable about the output shaft 151. A support shaft 154 is fixedly mounted to an upper surface of the other end of the gear mounting plate 153. A gear 155 is rotatably mounted on the support shaft 154 and is in mesh with the gear 152. When the gear mounting plate 153 is angularly moved about the output shaft 151 in the clockwise direction as viewed in FIG. 13, the gear 155 is brought into mesh with the gear teeth 146 on the reel mount 144, while when the gear mounting plate 153 is angularly moved in the counterclockwise direction, the gear 155 is brought into mesh with the gear teeth 145 on the reel mount 143. The gear mounting plate 153 is swung depending upon the rotational direction of the gear 152 in accordance with a selected tape running mode. Thus, as the motor 150 is driven for rotation with the gear 155 in mesh with the gear teeth 145 or 146, the reel mount 143 or 144 is rotated through the gears 152 and 155.

D. HEAD DRUM (FIGS. 12 through 14)

The head drum 158 is mounted on the chassis 131 at a location adjacent the rear end thereof. The head drum 158 is composed of an upper drum element 159, an intermediate drum element 160 and a lower drum element 161. At least one magnetic head 162 is mounted to a peripheral surface of the upper drum element 159. In the illustrated embodiment, a pair of magnetic heads 162 (only one shown in FIG. 12) are mounted on the peripheral surface of the upper drum element 159. The upper drum element 159 is mounted for rotation relative to the intermediate drum element 160. The intermediate and lower drum elements 160 and 161 constitute a drum motor 163, and the lower drum element 161 is mounted for rotation relative to the intermediate drum element 160. The lower and upper drum elements 161 and 159 are mounted on a common shaft such that when the lower drum element 161 rotates, the upper drum element 159 rotates. The intermediate drum element 160 is formed with a pair of mounting walls 164 and 165 which are mounted to upper surfaces of three respective supports 166, 167 and 168 outsert-formed on the upper surface of the chassis 131. As shown in FIG. 13, the support 168 is provided on its upper surface with a semi-spherical projection 169 which is engageable with a recess in the mounting wall 165 for positioning the head drum 158. The upper and intermediate drum elements 159 and 160 project upwardly from the chassis 131, while the lower drum element 161 projects downwardly from the chassis 131 through the head drum mounting bore 133. The entire head drum 158 has its central axis which is inclined to the left as viewed in FIG. 13, at a predetermined angle with respect to the vertical line perpendicular to the chassis 131.

E. CAPSTAN (FIGS. 7 and 12 through 14)

A capstan 170 is arranged on the upper surface of the chassis 131 at a location on the left side of the guide slot 135. A vertically extending capstan support member 171 is mounted on the chassis 131. The capstan support member 171 has a columnar or cylindrical shape provided at its vertically intermediate portion with a cut-out 172. The capstan 170 is rotatably supported by upper and lower end portions of the capstan support member 171. As shown in FIG. 12, the capstan 170 has its vertically intermediate portion which is exposed to the exterior at the cut-out 172 in the capstan support member 171. The capstan 170 has its lower end portion which projects downwardly from the chassis 131. A flywheel 174 is mounted to the lower end portion of the capstan 170 for rotation therewith.

A capstan driving motor 175 is arranged on the upper surface of the chassis 131 at a location adjacent the right upper corner thereof. The motor 175 has one side thereof which is fixedly mounted on a pivot 176 (see FIGS. 7 and 14) which, in turn, is mounted to the chassis 131 for angular movement about an axis of the pivot 176. The motor 175 has an output shaft 178 which projects downwardly from a bore 177 formed in the chassis 131. A pulley 179 is fixedly mounted on the output shaft 178 of the motor 175. The pivot 176 has a lower end portion which projects downwardly from the chassis 131, and a ring-like plate member 180 is fixed to the projecting end portion of the pivot 176. The plate member 180 is provided at a part thereof with an engaging portion 181 and is arranged so as to surround the output shaft 178 of the motor 175. A pin 182 is fixed to the plate member 180 at a location diametrically opposite to the pivot 176. The pin 182 projects upwardly from the chassis 131 through an arcuate slot 183 formed therein. The upper projecting end of the pin 182 is fixed to the motor 175. Thus, the motor 175 and the plate member 180 are pivotally movable about the pivot 176 within an extent within which the pin 182 is movable along the arcuate slot 183. A timing belt 184 is entrained about the flywheel 174 and the pulley 179. The timing belt 184 is formed on its one side with gear teeth. Likewise, an outer circumferential surface of each of the flywheel 174 and the pulley 179 is formed with gear teeth. The gear teeth on the timing belt 184 are in mesh with the gear teeth on the flywheel 174 and with the gear teeth on the pulley 179 so that no slippage occurs between them. A spring 185 is interposed under tension between the engaging portion 181 of the plate member 180 and the rearward end of the chassis 131 to apply a constant tension to the timing belt 184.

In the arrangement described above, as the motor 175 is driven for rotation, the rotational force is transmitted to the capstan 170 through the pulley 179, the timing belt 184 and the flywheel 174, so that the capstan 170 is rotated at a constant speed.

F. TAPE LOADING MECHANISM
(FIGS. 7 and 12 through 16)

A tape loading mechanism is generally designated by the reference numeral 188. The tape loading mechanism 188 has its principal elements including a pair of movable blocks having mounted thereon respective tape loading posts, a pinch roller, a pair of movable guide posts and a pair of drive gears for driving these component parts.

F-1 MOVABLE BLOCKS
(FIGS. 7 and 12 through 15)

A pair of guide blocks 189 and 190 are fitted in the respective guide slots 134 and 135 in the chassis 131 for movement along the respective guide slots 134 and 135.

Figure 15:
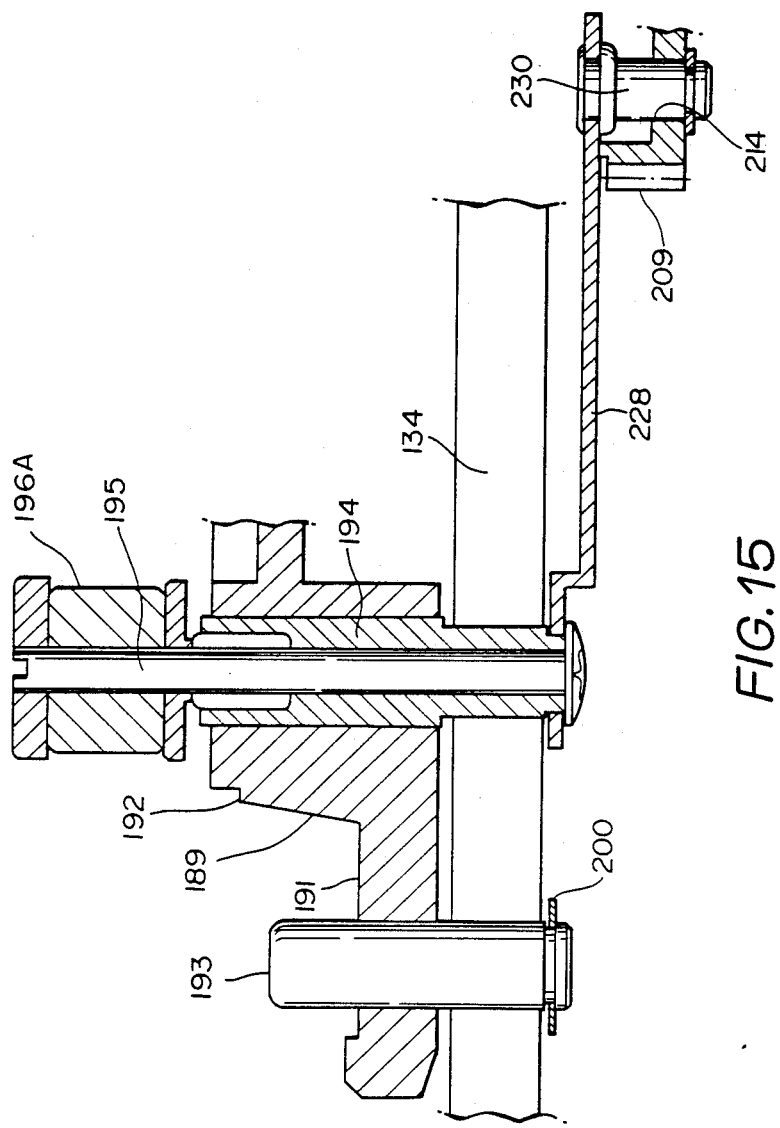
FIG. 15 is a fragmental cross-sectional view showing one of a pair of tape loading posts illustrated in FIGS. 12 and 13.
Figure 16:
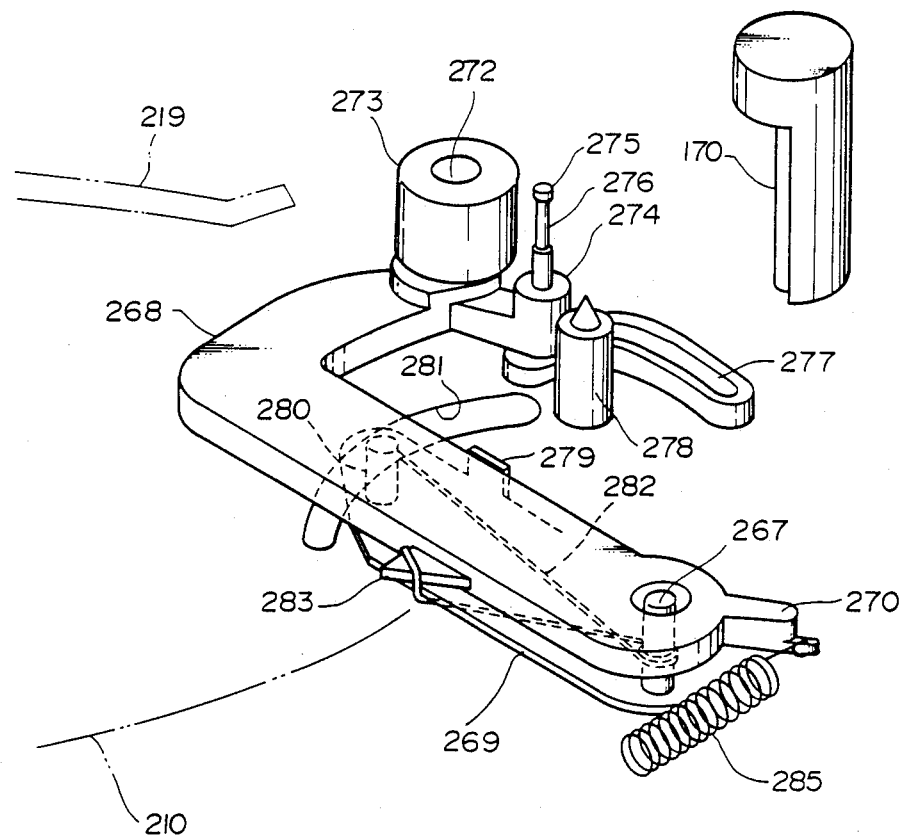
FIG. 16 is a perspective view of a pinch roller and associated component parts illustrated in FIGS. 12 and 13.

As shown in FIGS. 13 and 15, the movable block 189 has a main wall portion 191 and a mounting wall portion 192 projecting upwardly from a forward end of the main wall portion 191. A positioning pin 193 is fixedly mounted to the main wall portion 191 and projects upwardly and downwardly from the main wall portion 191. A cylindrical shaft 194 is fixedly mounted to the mounting wall portion 192 and projects downwardly therefrom. A support shaft 195 is inserted in and fixed to the cylindrical shaft 194 and projects upwardly from the mounting wall portion 192. A tape loading post 196A is fixedly mounted on the projecting end of the support shaft 195. The mounting wall portion 192 is formed with an engaging wall section 197 projecting forwardly and a projecting wall section 198 projecting laterally. An inclined guide post 199A is fixedly mounted to the projecting wall section 198. Lower ends of the respective positioning pin 193, cylindrical shaft 194 and support shaft 195 project downwardly from the chassis 131 through the guide slot 134. A ring 200 is mounted to the lower end of the positioning pin 193, and a tape loading post link 228 is mounted to the lower end of the cylindrical shaft 194, so that the movable block 189 is prevented from coming out upwardly. The loading post link 228 will be described later in detail.

The movable block 190 is arranged in a manner similar to the above-described movable block 189. Component parts similar to those of the movable block 189 are mounted to the movable block 190, and the movable block 190 is fitted in the guide slot 135 in a manner similar to the movable block 189. Specifically, the movable block 190 has a main wall portion 201 and a mounting wall portion 203. A positioning pin 202 is fixedly mounted to the main wall portion 201. A tape loading post 196B and an inclined guide post 199B are fixedly mounted to the mounting wall portion 203. An engaging wall section 204 is formed on the mounting wall portion 203.

The movable blocks 189 and 190 having mounted thereto the above-described various component parts are movable between their respective tape unloading positions illustrated in FIG. 13 and respective tape loading positions along the respective guide slots 134 and 135. In their respective tape unloading positions, the tape loading posts 196A and 196B and the inclined guide posts 199A and 199B are located on the inside of a portion 357 of a magnetic tape extending within the tape cassette 72 which is in the tape cassette loading position. In their respective tape loading positions, the movable blocks 189 and 190 are located remote from the tape cassette 72, and the positioning pins 193 and 202 are abutted respectively against the grooves 137 and 137 in the respective positioning plates 138 and 138.

F-2. DRIVE GEARS (FIGS. 7 and 14)

A pair of support shafts 207 and 208 are fixedly mounted to the lower surface of the chassis 131 at a generally central portion between the forward and rearward ends of the chassis 131. A pair of drive gears 209 and 210 are mounted respectively on the support shafts 207 and 208 for angular movement thereabout. The drive gears 209 and 210 have their respective gear teeth 211 and 212 in mesh with each other.

The drive gear 209 has an upper end face which is confronted with the chassis 131, and a cam 213 is formed on the upper end face of the drive gear 209. A circumferentially extending arcuate slot 214 is formed in the drive gear 209 adjacent an outer peripheral edge thereof. The cam 213 is composed of a pair of guide walls 215 and 216 and a pair of guide walls 217 and 218 continuous to the respective guide walls 215 and 216. The drive gear 210 is formed on its upper end face with a cam 219. A circumferentially extending arcuate slot is formed in the drive gear 210 adjacent an outer peripheral edge thereof. The 219 is composed of a pair of guide walls 221 and 222. The drive gear 210 is also formed in its outer peripheral edge with a cut-out at which the gear teeth 212 are partially cut out. The drive gear 210 is integrally provided with a tongue-like wall portion 224 having gear teeth continuous to the gear teeth 212. The tongue-like wall portion 224 extends into the cut-out 223. An upwardly projecting engaging portion 225 is formed on the tongue-like wall portion 224.

The drive gear 209 is connected to the movable block 189 through the above-mentioned loading post link 228, while the drive gear 210 is connected to the movable block 190 through a loading post link 229.

Specifically, a pin 230 is fixed to one end of the loading post link 228 arranged above the upper end face of the drive gear 209, and is fitted in the arcuate 25 slot 214 for movement therealong. The other end of the loading post link 228 is pivotally mounted on the cylindrical shaft 194 as shown in FIGS. 7 and 15. A pin 231 is fixed to on end of the loading post link 229 arranged above the upper end face of the drive gear 210, and is fitted in the arcuate slot 220 for movement therealong. The other end of the loading post link 229 is pivotally mounted on the cylindrical shaft 232 fixed to the movable block 190. As shown in FIG. 14, a pair of rings 233 and 234 are fixedly mounted respectively to lower ends of the respective pins 230 and 231 which project downwardly from the respective arcuate slots 214 and 220, whereby the pins 230 and 231 are prevented from coming out of the respective arcuate slots 214 and 220.

A torsion spring 235 serving as biasing means is mounted on the upper end face of the drive gear 209 for biasing the pin 230 along the arcuate slot 214 in the counterclockwise direction as viewed in FIG. 7, that is, in such a direction as to move the tape loading post 196A toward the tape loading position, as will become apparent from the ensuing description. Thus, the pin 230 is abutted by the torsion spring 235 against one end of the arcuate slot 214. Likewise, a torsion spring 236 serving as biasing means is mounted on the upper end face of the drive gear 210 for biasing the pin 231 along the arcuate slot 220 in the clockwise direction as viewed in FIG. 7, that is, in such a direction as to move the tape loading post 196B toward the tape loading position, as will become apparent from the ensuing description. Thus, the pin 231 is abutted by the torsion spring 236 against one end of the arcuate slot 220.

The arcuate slot 214, the pin 230 and the torsion spring 235 associated with the drive gear 209 cooperate with each other to form a lost-motion mechanism which enables angular movement of the drive gear 209 in the tape loading direction to be transmitted to the tape loading post 196A through the loading post link 228 until the tape loading post 196A moves to its tape loading position. However, the lost-motion mechanism prevents subsequent angular movement of the drive gear 209 after movement of the tape loading post 196A to its tape loading position, from being transmitted to the tape loading post 196A through the loading post link 228. Likewise, the arcuate slot 220, the pin 231 and the torsion spring 236 associated with the drive gear 210 cooperate with each other to form a lost-motion mechanism which enables angular movement of the drive gear 210 in the tape loading direction to be transmitted to the tape loading post 196B through the loading post link 229 until the tape loading post 196B moves to its tape loading position. However, the lost-motion mechanism associated with the drive gear 210 prevents subsequent angular movement of the drive gear 210 after movement of the tape loading post 196B to its tape loading position, from being transmitted to the tape loading post 196B through the loading post link 229.

As shown in FIG. 14, the drive gear 209 is formed on its lower end face with a projection 237. A spring 239 is interposed under tension between the projection 237 and a support shaft 238 which is mounted to the lower surface of the chassis 131. The spring 239 biases the drive gear 209 in the counterclockwise direction as viewed in FIG. 14 about the support shaft 207 to eliminate backlash between the drive gears 209 and 210.

With the movable blocks 189 and 190 in their respective tape unloading positions, as the drive gear 209 is angularly moved about the support shaft 207 in the clockwise direction as viewed in FIG. 7 and the drive gear 210 is angularly moved about the support shaft 208 in the counterclockwise direction, in other words, as the drive gears 209 and 210 are angularly moved in their respective tape loading directions, the movable blocks 189 and 190 are moved toward their respective tape loading positions through the respective loading post links 228 and 229. On the other hand, with the movable blocks 189 and 190 in their respective tape loading positions, as the drive gears 209 and 210 are angularly moved respectively in the clockwise and counterclockwise directions, that is, in their respective tape unloading directions, the movable blocks 189 and 190 are moved toward their respective tape unloading positions through the respective loading post links 228 and 229.

C. LOADING SWITCHING MECHANISM (FIGS. 7 and 14)

In FIGS. 7 and 14, a loading switching mechanism is generally designated by the reference numeral 242. The loading switching mechanism 242 is a mechanism for driving the above-described tape cassette loading mechanism 70 and the above-described tape loading mechanism 188, and is arranged in a manner described below.

A loading motor 243 serving as a drive source is mounted on the lower surface of the chassis 131 at the front right corner thereof. The loading motor 243 has an output shaft on which a worm 244 is mounted for rotation therewith.

Three support shafts 245, 246 and 247 are fixed to the lower surface of the chassis 131 behind the motor 243. A tape loading gear 248, an intermediate gear 249 and a tape cassette loading gear 250 are rotatably mounted respectively on the support shafts 245, 246 and 247. The tape loading gear 248 is composed of a large-diameter gear element 251 serving as a worm gear, and a small-diameter gear element 252 which is mounted on an upper end face of the large-diameter gear element 251 in coaxial relation thereto for rotation together therewith. The intermediate gear 249 is composed of a large-diameter gear element 253 and a small-diameter gear element 254 which is mounted on a lower end face of the large-diameter gear element 253 in coaxial relation thereto. A cam groove 259 having three guide sections 255, 256 and 257 is formed on the upper end face of the tape cassette loading gear 250.

The large-diameter gear element 251 of the tape loading gear 248 is in mesh with the worm 244, and the small-diameter gear element 252 of the tape loading gear 248 is in mesh with the large-diameter gear element 53 of the intermediate gear 249. When the tape loading posts 196A and 196B are in their respective tape unloading positions, the small gear element 252 of the tape loading gear 248 is in facing relation to the cut-out 223 in the drive gear 210 as shown in FIG. 7. As the drive gear 210 is angularly moved slightly in the tape loading direction, however, the gear teeth 212 on the drive gear 210 can be brought into mesh with the small-diameter gear element 252 of the tape loading gear 48. The small-diameter gear element 254 of the intermediate gear 249 is in mesh with the tape cassette loading gear 250. The right side portion of the tape cassette loading gear 250 projects outwardly through the opening 78 in the frame 71 shown in FIG. 8, and is in mesh with the rack gear teeth 89 on the slider 87 as will be seen from FIG. 7.

A pivot 260 is fixed to the lower surface of the chassis 131 behind the above-mentioned gears 248, 249 and 250. An L-shaped lever 261 serving as a cam follower is mounted on the pivot 248 for pivotal movement thereabout. The lever 261 has one end thereof formed into an engaging portion 262 which is located above the upper end face of the drive gear 210 such that the engaging portion 262 is engageable with the engaging wall portion 225 on the drive gear 210. A pin 264 is fixed to the other end 263 of the lever 261 and is slidably fitted in the cam groove 259 formed in the upper end face of the tape cassette loading gear 250.

H. OPERATION OF LOADING SWITCHING MECHANISM (FIGS. 7 and 19a through 19c)

In the illustrated embodiment, the arrangement is such that linear movement of the slider 87 along the slots 79 and 79 (see FIG. 8) causes the tape cassette 72 to be moved between the tape cassette loading and unloading positions, and angular movement of the drive gears 209 and 210 causes the magnetic tape portion 357 to be moved between the tape loading and unloading positions.

FIG. 19a shows that various component parts of the loading switching mechanism 242 are in their respective standby positions. The tape loading mechanism 188 is in the tape unloading position and the tape cassette loading mechanism 70 is in the tape cassette unloading position. In the standby state, the small-diameter gear element 252 of the tape loading gear 248 is in facing relation to the cut-out 223 in the drive gear 210, and is out of mesh with the gear teeth 212 on the drive gear 210. The pin 264 fixed to the lever 261 is located at the initiating end of the guide section 255 of the cam groove 259 formed in the tape cassette loading gear 250. In this state, the engaging portion 262 of the lever 261 is apart a predetermined distance away from the engaging wall portion 255 on the drive gear 210.

As the loading motor 243 is driven for rotation in the normal direction, the rotational force is transmitted to the tape loading gear 248 through the worm 244 to rotate the tape loading gear 248 in the direction indicated by the arrow A so that the intermediate gear 249 and the tape cassette loading gear 250 are rotated in their respective arrowed directions A. As the tape cassette loading gear 250 is rotated in the direction A, the slider 87 in mesh with the gear 250 is linearly moved rearwardly or upwardly as viewed in FIG. 19a, to initiate loading of the tape cassette 72. At this time, the drive gear 210 is not angularly moved, because the gear teeth 212 on the drive gear 210 are out of mesh with the tape loading gear 248. Accordingly, the tape loading mechanism 188 remains at the tape unloading position. As the tape cassette loading gear 250 is rotated, the pin 264 on the lever 261 moves along the guide section 255 of the cam groove 259. At the point of time the pin 264 reaches the terminating end of the guide section 255 as shown in FIG. 19b, loading of the tape cassette 72 is completed, that is, the tape cassette 72 is moved to the tape loading position.

Subsequently, as the pin 264 moves from the position illustrated in FIG. 19b toward a position illustrated in FIG. 19c along the guide section 256, the pin 264 is guided by the guide section 256 to cause the lever 261 to be pivotally moved about the pivot 260 in the counterclockwise direction as viewed in FIG. 19b. As the lever 261 is angularly moved in this direction, the engaging portion 262 of the lever 261 is brought into engagement with the engaging wall portion 225 on the drive gear 210 to urge the engaging wall portion 225. This causes the drive gear 210 to be angularly moved slightly in the clockwise direction or tape loading direction, whereby a forward one of the gear teeth formed on the tongue-like wall portion 224 is brought into mesh with the small-diameter gear element 252 of the tape loading gear 248. Thus, the drive gear 210 is angularly moved in the tape loading direction by the small-gear element 252 of the tape loading gear 248 to move the magnetic tape portion 357 toward the tape loading position. At the point of time the tape loading is completed, the loading motor 243 stops in rotation. While the engaging portion 262 of the lever 261 urges the engaging wall portion 225 on the drive gear 210, the pin 264 on the lever 261 moves along the guide section 257 of the cam groove 259. During this movement of the pin 264, the slider 87 is moved rearwardly a predetermined distance by the tape cassette loading gear 250 which continues to rotate.

In the state described above, if it is desired to move the magnetic tape portion 357 to the tape unloading position and to move the tape cassette 72 to the tape cassette unloading position, the loading motor 243 is driven for rotation in the reverse direction to rotate the tape loading gear 248, the intermediate gear 249 and the tape cassette loading gear 250 in their respective arrowed directions B. This causes the drive gear 210 to be angularly moved in the tape unloading direction to move the magnetic tape portion 357 to the tape unloading position. During this rotation of the tape cassette loading gear 250, the slider 87 is linearly moved forwardly or downwardly as viewed in FIG. 7. As the drive gear 250 is angularly moved in the tape unloading direction, the gear teeth 212 on the drive gear 210 are brought out of mesh with the small-diameter gear 252 of the tape loading gear 248 in the order reverse to that described above, so that the unloading of the magnetic tape portion 357 is completed. Subsequently, unloading of the tape cassette 72 is effected, and the loading motor 243 stops in rotation at the point of time the unloading of the tape cassette 72 is completed.

I. PINCH ROLLER (FIG. 12, 13 and 16)

A pivot 267 is fixed to the upper surface of the chassis 131 at the right side thereof. One ends of respective pinch roller arm 268 and auxiliary arm 269 are mounted on the pivot 267 for pivotal movement thereabout.

The pinch roller arm 268 is formed into an L-shape and is provided at its one end with a projection 270. The pinch roller arm 268 is formed at its other end with an engaging wall portion 271 which is engageable with the engaging wall section 204 of the movable block 190. A support shaft 272 is fixed to the other end of the pinch roller arm 268. Rotatably mounted on the support shaft 272 is a pinch roller 273 which is formed of an elastic material such as rubber or the like. The support shaft 272 has a lower end portion which projects downwardly from the pinch roller arm 268. A guide post arm 274 has one end thereof which is mounted on the projecting end portion of the support shaft 272 for angular movement relative thereto. A movable guide post 275 is fixedly mounted to the other end of the guide post arm 274. The movable guide post 275 is formed with a circumferential groove 276 as clearly shown in FIG. 16 for guiding the magnetic tape portion 357 subsequently to be described. The movable guide post 275 has a lower end portion which projects downwardly from the guide post arm 274 and which is fitted in a cam groove 277 formed on the upper surface of the chassis 131. The cam groove 277 is formed so as to get clear of a vertically extending tape cassette guide pin 278 mounted to the chassis 131. That is, the cam groove 277 extends from a location on the left side of the guide pin 278 to a location in rear thereof. The details of the guide pin 278 will be described later.

An engaging piece 279 is provided at the other end of the auxiliary arm 269 and extends upwardly therefrom. A pin 280 is fixed to the other end of the auxiliary arm 269. The pin 280 projects downwardly from the chassis 131 through an arcuate slot 281 formed therein. The projecting lower end of the pin 280 is engageable with the cam 219 on the drive gear 210 shown in FIGS. 7 and 16. A spring 282 is wound about the pivot 267 and has one end in engagement with the pin 280 and the other end in engagement with an engaging portion 283 formed at the front side edge of the pinch roller arm 268. Thus, the pinch roller arm 268 is biased about the pivot 267 in the clockwise direction as viewed in FIG. 13, and the auxiliary arm 269 is biased in the counterclockwise direction about the pivot 267 so that the engaging piece 279 on the auxiliary arm 269 is in engagement with the rear side edge of the pinch roller arm 268. A spring 285 is interposed under tension between the projection 270 of the pinch roller arm 268 and a projection 284 formed on the chassis 131, so that the pinch roller arm 268 and the auxiliary arm 269 are biased by the spring 285 about the pivot 267 in the clockwise direction as viewed in FIG. 13.

In the arrangement described above, when the magnetic tape portion 357 is in the tape unloading position, the engaging wall portion 271 of the pinch roller arm 268 is in engagement with the engaging wall section 204 of the movable block 190. As the movable block 190 moves rearwardly toward its tape loading position, the pinch roller arm 268 moves following the movable block 190 under th biasing force of the spring 285, in the clockwise direction about the pivot 268, so that the pinch roller 273 moves toward the capstan 170. The movable guide post 275 moves along the cam groove 227 toward a position off to the upper right of the guide pin 278.

J. TAPE TENSIONING MECHANISM (FIG. 7, 13 17 and 18)

In FIGS. 7 and 13, a tape tensioning mechanism is generally designated by the reference numeral 287. The tape tensioning mechanism 287 is a mechanism for applying a constant back tension to the magnetic tape portion 357 running along a predetermined path in the play mode. The tape tensioning mechanism 287 is arranged in a manner described below.

A pivot 288 is fixed to the upper surface of the chassis 131 at an intermediate location of the left side thereof. A tension adjusting arm 289 has one end thereof which is pivotally mounted on the pivot 288. The tension adjusting arm 289 is formed generally into a U-shape or fishing-hook shape. An engaging projection 290 formed adjacent the one end of the tension adjusting arm 289. A tension adjusting pin 291 is fixed to the other end of the tension adjusting arm 289. A projection 292 is also formed at the one end of the tension adjusting arm 298. A spring 294 is interposed under tension between the projection 292 and a projection 293 formed on the chassis 131. Thus, the tension adjusting arm 289 is biased by the spring 294 about the pivot 288 in the counterclockwise direction as viewed in FIG. 13. In the tape unloading position, the tension adjusting pin 291 is in engagement with the engaging wall section 197 of the movable block 189.

Figure 17:
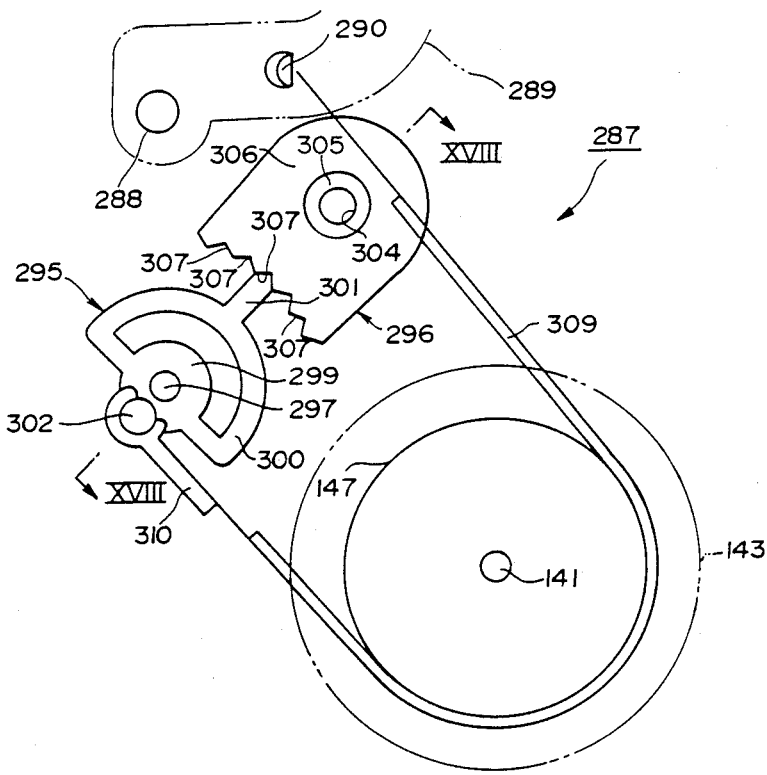
FIG. 17 is a fragmental top plan view showing component parts of a tape tensioning mechanism illustrated in FIG. 12 and 13.
Figure 18:
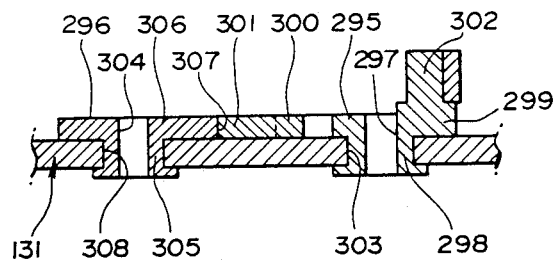
FIG. 18 is a cross-sectional view taken along the line XVIII—XVIII in FIG. 17.
Figures 19A, 19B, 19C:
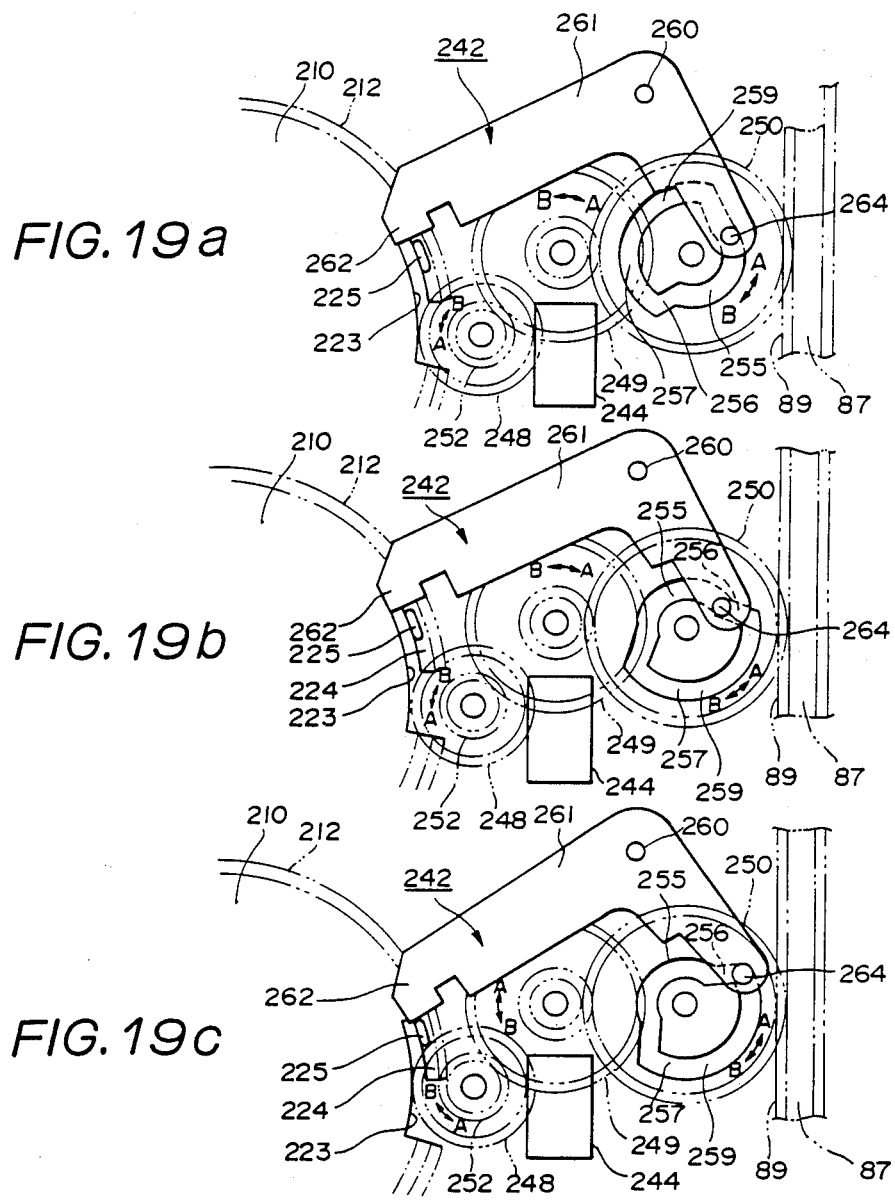
FIGS. 19a through 19c are views for explanation of operation of a loading switching mechanism illustrated in FIG. 7.

As shown in detail in FIGS. 17 and 18, an offset adjusting member 295 and a fixed member 296 are arranged in front of the pivot 288 on the chassis 131. The offset adjusting member 295 is formed with a mounting shaft portion 298 having therein a central bore 297. A main wall portion 299 is formed at an upper end of the mounting shaft portion 298. A generally D-shaped resilient wall portion 300 is formed along a part of an outer peripheral edge of the main wall portion 299. An engaging projection 301 is formed at an outer peripheral edge of the resilient wall portion 300. A shaft portion 302 is formed on the main wall portion 299 in diametrically opposite relation to the engaging projection 301. The above-mentioned various portions of the offset adjusting member 295 are integrally formed of synthetic resin. The mounting shaft portion 298 of the offset adjusting member 295 is pivotally fitted in a bore 303 formed in the chassis 131. The fixed member 296 is formed with a mounting wall portion 305 having therein a central bore 304. A main wall portion 306 is formed at an upper end of the mounting wall portion 305. A plurality of recesses 307 are formed at one side edge of the main wall portion 306, which faces toward the offset adjusting member 295. The engaging projection 301 of the offset adjusting member 295 is engageable with a selected one of the recesses 307. The above mentioned various portions of the fixed member 296 are integrally formed of synthetic resin. The mounting wall portion 305 of the fixed member 296 is fixedly fitted in a bore 308 formed in the chassis 131. The recesses 307 are arranged along an angular movement locus of a forward end of the engaging projection 301 such that the engaging projection 301 is engageable with a selected one of the recesses 307 while resiliently deforming the resilient wall portion 300. These offset adjusting member 295 and fixed member 296 are obtained such that synthetic resin is outsert-formed on the chassis 131.

A tension applying band 309 has one end thereof which is fixedly connected to the projection 290 on the tension adjusting arm 298. The band 309 has an intermediate portion which is wrapped about the drum portion 147 of the reel mount 143. The other end of the band 309 is fixedly connected to the shaft portion 302 of the offset adjusting member 295 through a mounting member 310.

A pivot 311 is fixed to the lower surface of the chassis 131 on the left side of the support shaft 207 on which the drive gear 209 is mounted. A slightly bent arm 312 is mounted on the pivot 311 for pivotal movement thereabout. A pin 313 is fixed to one end of the arm 312 and projects downwardly therefrom. A pin 314 is fixed to the other end of the arm 312 and projects upwardly therefrom. The pin 313 is fitted in a channel defined between the guide walls 215 and 216 of the cam 213 on the drive gear 209. The pin 314 extends through an arcuate slot 315 formed in the chassis 131 and projects upwardly therefrom.

As the drive gear 209 moves angularly, the pin 313 on the arm 312 is guided by the cam 213 so that the arm 312 is angularly moved about the pivot 311 to thereby move the pin 315 along the arcuate slot 315. The pin 314 serves to control the position of the free end of the tension adjusting arm 289 subsequently to be described.

In the arrangement described above, the engaging projection 301 of the offset adjusting member 295 is brought into engagement with a selected one of the recesses 307 in the fixed member 296. During rotation of the reel mount 143, as the tension adjusting arm 289 angularly moves about the pivot 288 in the counterclockwise direction as viewed in FIG. 13, the intermediate portion of the band 309 is urged against the drum portion 147 of the reel mount 143 to apply a brake to rotation thereof. As will be described later, during operation of the apparatus, the tension adjusting pin 291 on the tension adjusting arm 289 biased in the counterclockwise direction about the pivot 288 by the spring 294 moves in response to a change in tension in the magnetic tape portion 357. By this movement of the tension adjusting pin 291, the tension adjusting arm 289 is angularly moved slightly in the clockwise or counterclockwise direction about the pivot 288 thereby varying the amount of brake applied by the band 309 to the reel mount 143.

Thus, in the arrangement described above, initial setting of the amount of brake to be applied to the drum portion 147, and adjustment of the amount of brake when the band 309 is worn can be effected in the following manner. That is, in order to effect adjustment of the amount of brake to the drum portion 147, a jig such as a pin or the like is employed to operate the engaging projection 301 to angularly move the offset adjusting member 295 about the central bore 297, thereby moving the engaging projection 301 from the currently utilized recess 307 to another one of the recesses 307. This alters the position of the shaft portion 302 to which the other end of the band 309 is fixedly connected, so that the amount of brake to the drum portion 147 varies. By changing the recess 307 to another one with which the engaging projection 301 is to be in engagement, it is possible to adjust the amount of brake applied to the drum portion 147 of the reel mount 143.

K. BRAKE MECHANISM
(FIGS. 7 and 12 through 14)

In FIGS. 7, 12 and 13, a brake mechanism is generally designated by the reference numeral 317. The brake mechanism 317 serves to restrain the reel mounts 143 and 144 from rotation, in accordance with the modes of operation of the apparatus, and is arranged in a manner described below.

As shown in FIGS. 12 and 13, a pair of pivots 318 and 319 are fixed to the chassis 131 at a location adjacent the front end thereof. A first brake lever 320 is mounted on the pivot 318 for pivotal movement thereabout, while a second brake lever 321 is mounted on the pivot 319 for pivotal movement thereabout.

The brake lever 320 is composed of a pair of legs 322 and 323 and a projection 324. At base ends of these respective portions, the brake lever 320 is pivotally mounted on the pivot 318. The leg 322 has a forward end to which a brake pad 325 is fixedly mounted. An inclined surface 326 is formed on a rear side edge of the leg 323. The brake lever 321 is composed of a pair of legs 327 and 328 and a projection 329. At base ends of these respective portions, a slot 330 is formed in the brake lever 321. The pivot 319 extends through the slot 330 so that the brake lever 321 is Pivotally movable about the pivot 319 and is also linearly movable toward and away from the pivot 318 for the brake lever 320. A brake pad 331 is fixedly mounted to a forward end of the leg 327. A projection 332 and an inclined surface 333 are formed at a forward end of the leg 328. A spring 334 is interposed under tension between the projection 324 of the brake lever 320 and the projection 329 of the brake lever 321. By the spring 334, the brake lever 320 is biased about the pivot 318 in the counterclockwise direction as viewed in FIG. 13, and the brake lever 321 is biased in the clockwise direction about the pivot 319 and to the left, i.e., toward the pivot 318.

An elongated slide plate 335 is arranged for movement to the right and left, on the upper surface of the chassis 131 and below the brake levers 320 and 321. A pin 336 is fixed to a longitudinally intermediate portion of the slide plate 335 and is in engagement with the rear side edge of the leg 323 of the brake lever 320 and with the projection 332 on the leg 328 of the brake lever 321. A slot 349 is formed in a left upper portion of the slide plate 335.

As shown in FIG. 7, the above-mentioned support shaft 238 is fixed to the lower surface of the chassis 131 at a location adjacent the front left corner thereof. A brake gear 341 in mesh with the drive gear 209 is mounted on the support shaft 238 for rotation thereabout. Formed in an upper end face of the brake gear 341 is a cam groove 344 having guide sections 342 and 343. A pivot 345 is fixed to the lower surface of the chassis 131 at a location adjacent the support shaft 238.

An arm 346 has one end thereof which is pivotally mounted on the pivot 345. A pin 347 is fixed to an intermediate portion of the arm 346 and projects into the cam groove 344 in the upper end face of the brake gear 341. A pin 348 is fixed to the other end of the arm 346 and extends upwardly therefrom. The pin 348 extends upwardly from the chassis 131 through a bore 349 formed therein, and projects into the slot 337 in the slide plate 335.

In the arrangement described above, as the brake gear 341 rotates, the pin 347 runs along the cam groove 344. During running of the pin 347 along the guide section 342 of the cam groove 344, the arm 346 remains at the position shown in FIG. 7. During running of the pin 347 along the guide section 343 of the cam groove 344, the arm 346 is pivotally moved about the pivot 345 in the clockwise and counterclockwise directions. Angular movement of the arm 346 causes the pin 348 thereon to linearly move the slide plate 335 to the right and left as viewed in FIG. 13, so that the pin 336 on the slide plate 335 is moved to the right and left. Following movement of the pin 336, the brake lever 320 is angularly moved about the pivot 318, and the brake lever 321 is moved toward and away from the pivot 318 and is angularly moved about the pivot 319.

FIG. 13 shows a state in which the pin 336 is in the rightmost position. In this state, the brake pad 325 of the brake lever 320 is located in spaced relation to the outer peripheral surface of the reel mount 143, while the brake pad 331 on the brake lever 321 is urged against the outer peripheral surface of the reel mount 144. Accordingly, a brake is applied to the reel mount 144. As the pin 336 moves from the position shown in FIG. 13, slightly to the left, the projection 332 follows the pin 336 to permit the brake lever 321 to move slightly to the left so that the brake pad 331 is disengaged from the reel mount 144. Thus, in this state, no brake is applied to both the reel mounts 143 and 144. As the pin 336 moves from this state further to the left, the projection 332 follows the pin 336 and the brake lever 321 moves to the left. As the inclined surface 333 on the brake lever 321 is brought into coincidence with the inclined surface 326 on the brake lever 320, the brake levers 320 and 321 are angularly moved under the biasing force of the spring 334, while the inclined surfaces 326 and 333 are in sliding contact with the pin 336. That is, the brake lever 320 is angularly moved in the counterclockwise direction about the pivot 318, and the brake lever 321 is angularly moved in the clockwise direction about the pivot 319. The brake pad 325 on the brake lever 320 is urged against the outer peripheral surface of the reel mount 143, and the brake pad 331 on the brake lever 321 is urged against the outer peripheral surface of the reel mount 144. Thus, a brake is applied to both the reel mounts 143 and 144.

In this manner, the brake mechanism 317 is movable among three positions including the position where the brake is applied only to the reel mount 144, the position where both the reel mounts 143 and 144 are released from the brake, and the position where the brake is applied to both the reel mounts 143 and 144. The brake mechanism 317 moves among the three positions by rotation of the brake gear 341 in accordance with the modes of operation of the apparatus.

L. OTHER ARRANGEMENT (FIGS. 12 and 13)

A tape cassette guide pin 351 extending upwardly is arranged in rear of the pivot 288 on which the tension adjusting arm 289 is mounted. The tape cassette guide pin 351 cooperates with the aforesaid tape cassette guide pin 278 located in front of the capstan 170, to position the tape cassette 72.

A pair of fixed guide posts 352 and 353 are arranged on the left side of the guide slot 134 for the movable block 189 such that the arcuate slot 315 is located between the fixed guide posts 352 and 353.

As shown in FIG. 13, the tape cassette 72 comprises a cassette case 356 in which the magnetic tape is accommodated. A recess 358 is formed in the forward edge of the cassette case 356 which faces toward the head drum 158 when the tape cassette 72 is in the tape cassette loading position. The magnetic tape portion 357 extends along the forward edge of the cassette case 356. In the tape unloading position, the tape loading posts 196A and 196B are located on the inside of the magnetic tape portion 357, i.e., within the recess 358 in the forward edge of the cassette case 356. When the tape loading posts 196A and 196B move from their respective tape unloading positions toward the respective tape loading positions, the tape loading posts 196A and 196B draw the magnetic tape portion 357 out of the cassette case 356. A closure member (not shown) is provided at the forward edge of the cassette case 356 for opening and closing the recess 358. A tape supply reel and a tape take-up reel (both not shown) are rotatably arranged within the cassette case 356. The magnetic tape portion 357 from the tape supply reel passes through a tape exit 359, extends in front of the recess 358, passes through a tape entrance 360, and is wound about the tape take-up reel. Formed in a lower side face of the cassette case 356 are positioning bores (not shown) into which the tape cassette guide pins 278 and 351 of the apparatus are inserted respectively.

M. OPERATION OF MAGNETIC RECORDING AND/OR REPRODUCING APPARATUS
(FIGS. 8 through 11, 13, 16, 19a through 19c and 20a through 20d)

In the magnetic recording and/or reproducing apparatus constructed as described above, loading and unloading of the tape cassette 72, loading and unloading of the magnetic tape portion 357, movement of the pinch roller 273, operation of the tape tensioning mechanism 287 and operation of the brake mechanism 317 are effected in a manner described below.

When the apparatus is in the standby state, the various component parts of the apparatus are in the state shown in FIGS. 8, 10, 13 and 20a. That is, in the standby state, as shown in FIGS. 8 and 10, the follower pins 84 and 85 of the tape cassette holder 80 of the tape cassette loading mechanism 70 are located respectively at the forward ends of the horizontal sections 76A and 77A of the respective guide slots 76 and 77, so that the tape cassette holder 80 is located adjacent the forward end of the frame 71. The drive gears 209 and 210 are located at the limit position in the tape cassette unloading direction, i.e., at the position shown in FIG. 20a, where the pin 313 fixed to the arm 312 is located in the channel between the guide walls 215 and 216 of the cam 213, and the pin 280 fixed to the auxiliary arm 269 is apart away from the guide walls 221 and 222 of the cam 219. The movable blocks 189 and 190 are located respectively at the forward ends of the respective guide slots 134 and 135. The engaging wall portion 271 of the pinch roller arm 268 is in engagement with the engaging wall section 204 of the movable block 190. The tension adjusting pin 291 fixed to the tension adjusting arm 289 is in engagement with the engaging wall section 197 of the movable block 189. The loading switching mechanism 242 is in the standby position as shown in FIG. 19a. In the brake mechanism 317, the brake pad 325 on the brake lever 331 is urged against the outer peripheral surface of the reel mount 144 to restrain the same from rotation.

In the state described above, when it is desired to record or reproduce signals on or from the magnetic tape, the tape cassette 72 is inserted into the opening 106 of the frame 71 and is loaded on the tape cassette holder 80. A detector (not shown) detects that the tape cassette 72 is loaded in position on the tape cassette holder 80, to generate a signal. In response to the signal from the detector, the loading motor 243 is driven for rotation in the normal direction. By the rotation of the loading gear 243 in the normal direction, the tape loading gear 248, the intermediate gear 249 and the tape cassette loading gear 250 are rotated in their respective directions A in the state shown in FIG. 19a, so that the slider 87 is linearly moved rearwardly. As the slider 87 is linearly moved rearwardly, as shown in FIG. 8, the main gear 94 in mesh with the rack gear teeth 88 on the slider 87 is angularly moved in the direction D to angularly move the gear 95 in the direction C, so that the pivoting members 97 and 98 are angularly moved in their respective directions C. As the pivoting members 97 and 98 are angularly moved in their respective directions C, the follower pins 84 and 85 located respectively within the grooves 99 and 100 in the respective pivoting members 97 and 98 are moved respectively from the horizontal sections 76A and 77A toward the vertical sections 76B and 77B of the respective guide slots 76 and 77. Thus, the tape cassette holder 80 having mounted thereon the tape cassette 72 is moved along the configuration of the guide slots 76 and 77, that is, is moved horizontally rearwardly through a fixed distance and, subsequently, vertically downwardly. The tape cassette 72 descending together with the tape cassette holder 80 is finally positioned on the reel mounts 143 and 144 as shown in FIG. 13, where the reel engaging shafts 148 and 149 of the respective reel mounts 143 and 144 are brought respectively into engagement with the engaging bores in the respective tape reels within the tape cassette 72 so that the tape reels within the tape cassette 72 can be rotated together with the respective reel mounts 143 and 144. At this point of time, the rack gear teeth 88 on the slider 87 are brought out of mesh with the main gear 94 so that the tape cassette holder 80 stops in its downward movement. Thus, loading of the tape cassette 72 is completed, i.e., the tape cassette 72 is moved to the tape cassette loading position. The tape cassette loading gear 250 subsequently continues to rotate to move the slider 87 rearwardly.

Figure 20A:
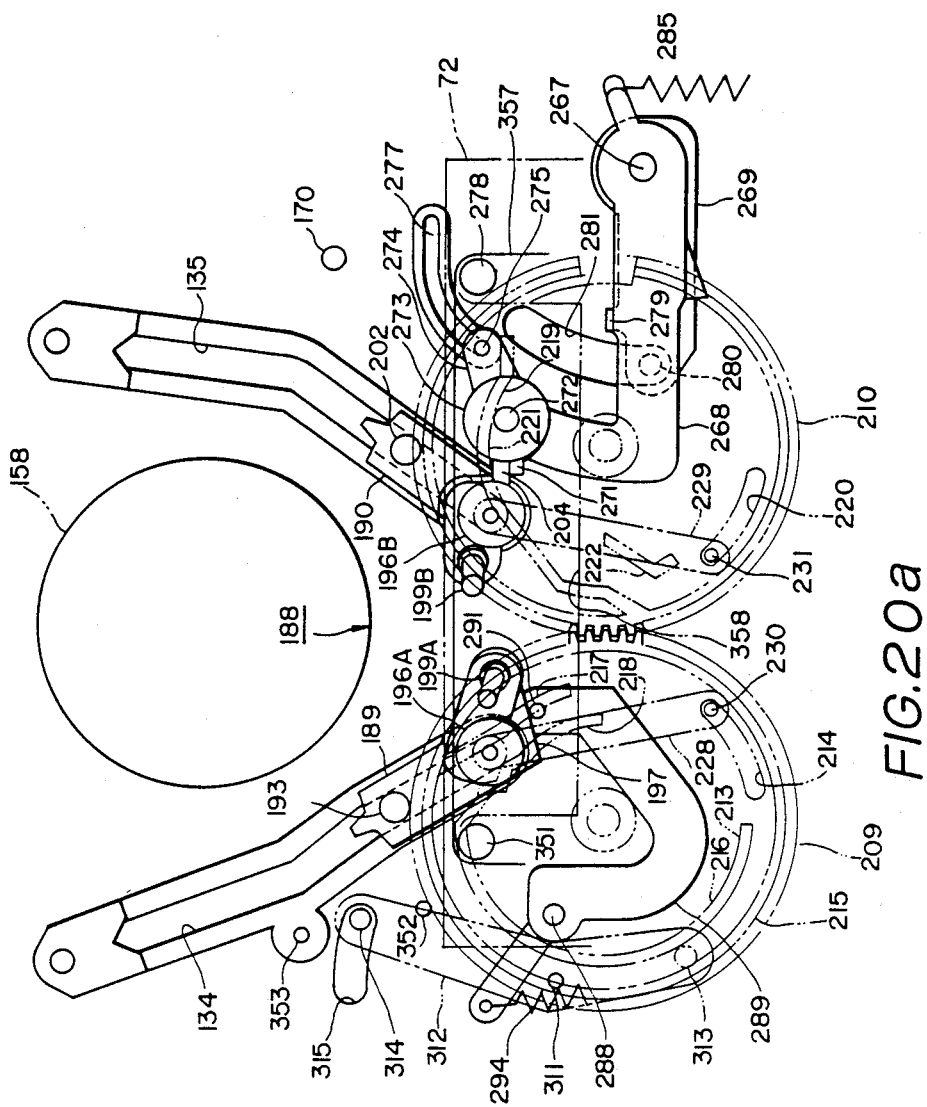
FIGS. 20a through 20d are views for explanation of operation of a tape loading mechanism illustrated in FIG. 7.

During movement of the tape cassette 72 from the tape cassette unloading position toward the tape cassette loading position, the tape loading posts 196A and 196B, the inclined guide posts 199A and 199B, the pinch roller 273 and the movable guide post 275 are located within the recess 358 in the tape cassette 72 as shown in FIGS. 13 and 20a, that is, are located on the inside of the magnetic tape portion 357 extending along the front edge of the tape cassette 72.

As the loading of the tape cassette 72 is completed as described above, the loading switching mechanism 242 shifts from the position shown in FIG. 19b to the position shown in FIG. 19c. As described previously, the lever 261 is angularly moved by the tape cassette loading gear 250, and the engaging portion 262 of the lever 261 is brought into engagement with the engaging wall portion 225 on the drive gear 210 and urges the engaging wall portion 225. This brings the gear teeth 212 on the drive gear 210 into mesh with the tape loading gear 248 so that the drive gear 210 and the drive gear 209 in mesh therewith are angularly moved in their respective tape loading directions by the tape loading gear 248.

Figure 20B:
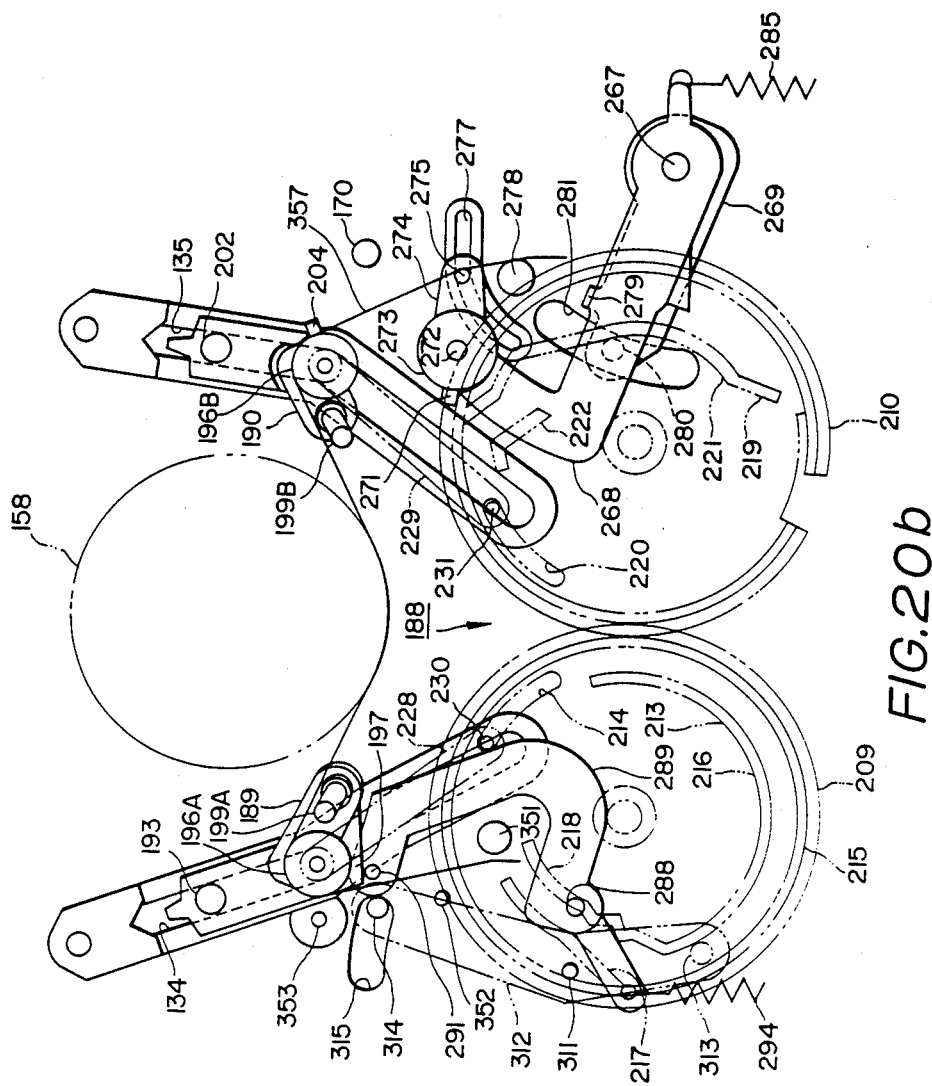

As the drive gears 209 and 210 are angularly moved in their respective tape loading directions, the movable blocks 189 and 190 are moved rearwardly toward their respective tape loading positions as shown in FIG. 20b. Thus, the tape loading posts 196A and 196B draw the magnetic tape portion 357 out of the tape cassette 72 and wrap the drawn magnetic tape portion 357 about the head drum 158 by a predetermined wrapping angle.

During movement of the tape loading posts 196A and 196B toward their respective tape loading positions, the pinch roller arm 268 biased by the spring 285 in the clockwise direction with the engaging wall portion 271 in engagement with the engaging wall section 204 of the movable block 190, is angularly moved in the clockwise direction following movement of the movable block 190, to move the pinch roller 273 toward the capstan 170. As the pinch roller arm 268 is angularly moved in the clockwise direction, the movable guide post 275 is moved along the cam groove 277 toward the right end thereof while the guide post arm 274 moves angularly. The movable guide post 275 moves the magnetic tape portion 357 toward the capstan 170, ahead of the pinch roller 273. During this movement, the magnetic tape portion 357 is guided by the circumferential groove 276 (see FIG. 16) formed in the movable guide post 275. The pinch roller arm 268 once stops at the point of time the engaging wall portion 271 of the pinch roller arm 268 is disengaged from the engaging wall section 204 of the movable block 190. At this time, the pin 280 fixed to the auxiliary arm 269 is abutted against the guide wall 221 of the cam 219 formed on the drive gear 210.

When the movable block 189 is moved rearwardly, the tension adjusting arm 289 biased by the spring 294 in the counterclockwise direction with the tension adjusting pin 291 in engagement with the engaging wall section 197 of the movable block 189, is angularly moved in the counterclockwise direction following the movement of the movable block 189 as shown in FIG. 20b. The moving end of the tension adjusting arm 289 is abutted against the pin 314 located at the right end of the arcuate slot 315 so that the tension adjusting arm 289 stops at this position.

Figure 20C:
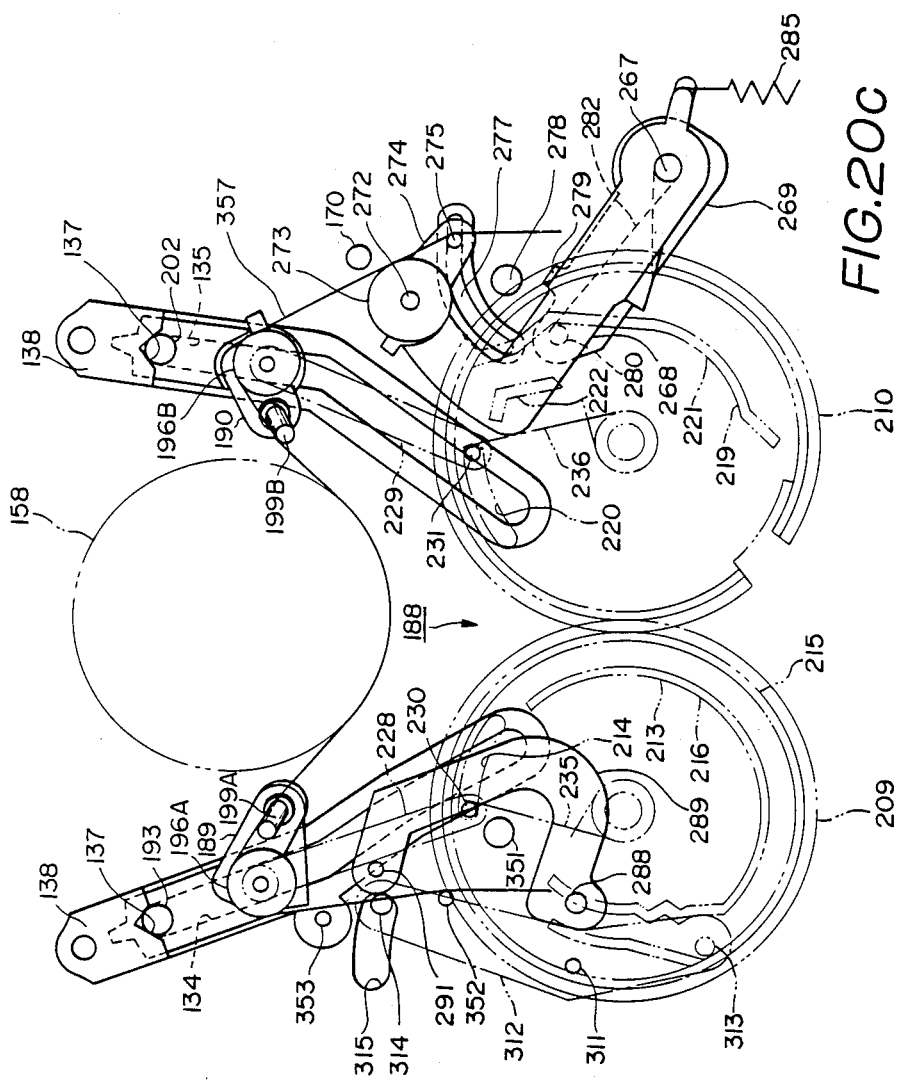

The movable blocks 189 and 190 moving rearwardly stop in movement at the point of time the positioning pins 193 and 202 are brought into engagement respectively with the grooves 137 and 137 in the respective positioning plates 138 and 138, as shown in FIG. 20c. Thus, the movable blocks 189 and 190 are located at their respective tape loading positions. During movement of the movable blocks 189 and 190 from the position shown in FIG. 20b toward the position shown in FIG. 20c, angular movement of the drive gear 210 causes the guide wall 221 of the cam 219 to guide the pin 280 fixed to the auxiliary arm 269 whereby, as shown in FIG. 20c, the pinch roller arm 268 is angularly moved together with the auxiliary arm 269 in the clockwise direction so that the pinch roller 273 is further moved toward the capstan 170 and the movable guide post 275 is further moved toward the right end of the cam groove 277. Thus, at the point of time the movable blocks 189 and 190 reach their respective tape loading positions, the loading motor 243 stops in rotation, so that the stop mode is established. Just before establishment of the stop mode, the brake lever 321 of the brake mechanism 317 shown in FIG. 13 releases the restraint from the reel mount 144. At the point of time the stop mode is established, the tape cassette loading gear 250 stops in rotation so that rearward movement of the slider 87 stops.

In the stop mode described above, the pinch roller 273 is located apart a fixed distance away from the capstan 170 as shown in FIG. 20c. Also, the tension adjusting pin 291 is located apart a fixed distance away from the magnetic tape portion 357.

Figure 20D:
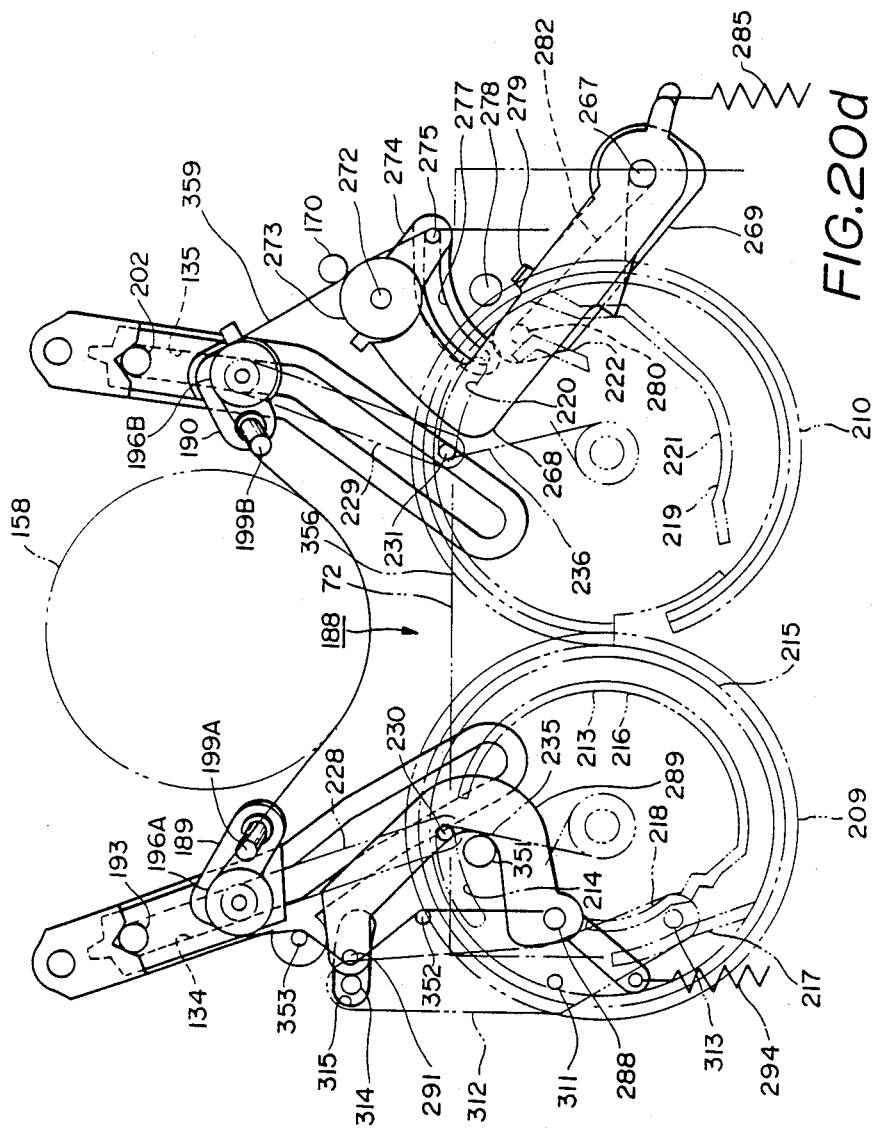

In the stop mode described above, as signal recording or reproducing is commanded, the loading motor 243 further rotates by a fixed angle in the normal direction to angularly move the drive gears 209 and 210 by a fixed angle in their respective tape loading directions. At this time, as shown in FIG. 20d, the drive gear 209 is angularly moved against the biasing force of the torsion spring 235 while the pin 230 remains stationary at the position, until the position of the pin 230 shifts from the one end to the other end of the arcuate slot 214. Likewise, the drive gear 210 is angularly moved against the biasing force of the torsion spring 236 while the pin 231 remains stationary at the position, until the position of the pin 231 shifts from the one end to the other end of the arcuate slot 220.

As the drive gear 209 angularly moves as described above, the guide walls 217 and 218 of the cam 213 formed on the drive gear 209 guide the pin 313 fixed to the arm 312, to thereby angularly move the arm 312 in the counterclockwise direction so that the pin 314 fixed to the arm 312 moves to the left end of the arcuate slot 315. As the pin 314 moves to the left end of the arcuate slot 315, the tension adjusting arm 289 in engagement with the pin 314 is angularly moved by a fixed angle in the counterclockwise direction under the biasing force of the spring 294, so that the tension adjusting pin 291 is angularly moved by a fixed distance to the left. The tension adjusting pin 291 slightly bends a section of the magnetic tape portion 357 extending between the fixed guide posts 352 and 353, thereby applying a predetermined tension to the magnetic tape portion 357.

As the drive gear 210 angularly moves as described above, the guide wall 221 of the cam 219 formed on the drive gear 210 guides the pin 280 fixed to the auxiliary arm 269, to thereby permit the pinch roller arm 268 to be angularly moved together with the auxiliary arm 269 in the clockwise direction under the biasing force of the spring 285, so that the pinch roller 273 is brought into contact with the capstan 170 through the magnetic tape portion 358 located therebetween. Subsequently, the guide wall 222 of the cam 219 guides the pin 280, to thereby angularly move the auxiliary arm 269 a fixed angle in the clockwise direction. Thus, the pinch roller 273 on the pinch roller arm 268 biased by the spring 282 urges the magnetic tape portion 357 against the capstan 170.

During the above-described angular movement of the drive gears 209 and 210, the brake levers 320 and 321 of the brake mechanism 317 shown in FIG. 13 once restrain both the respective reel mounts 143 and 144 from rotation and, subsequently, release the restraint from both the respective reels 143 and 144.

Thus, the apparatus is brought to the play mode shown in FIG. 20d. In the play mode, the magnetic tape portion 357 drawn out of the tape cassette 72 through the left-hand end of the cassette case 356 extends in contact with the fixed guide post 352, the tension adjusting pin 291 and the fixed guide post 352. The magnetic tape portion 357 is then wrapped about the tape loading post 196A and is turned back thereat. Subsequently, the magnetic tape portion 357 extends in contact with the inclined guide post 199A, and is wrapped about the head drum 158. The magnetic tape portion 357 from the head drum 158 extends in contact with the inclined guide post 199B. The magnetic tape portion 357 is then wrapped about the tape loading post 96B and is turned back thereat. The magnetic tape portion 357 passes between the capstan 170 and the pinch roller 273 and extends in contact with the movable guide post 275. Subsequently, the magnetic tape portion 357 is introduced into the right-hand end of the cassette case 356.

In the state described above, the reel mount driving motor 150, the capstan driving motor 175 and the head drum driving motor 158 are driven so that the magnetic tape portion 357 is run at a constant speed by the capstan 170 and the pinch roller 278 along the above-mentioned path. The reel mount 144 is driven so that the magnetic tape portion 357 is taken up about the take-up reel within the tape cassette 72. The upper drum element 159 of the head drum 158 is rotated so that signals are recorded on or reproduced from the magnetic tape.

During the above-described signal recording or reproducing operation, the tension in the magnetic tape portion 357 is maintained constant by the tape tensioning mechanism 287. That is, in FIGS. 17 and 20d, when the tension in the magnetic tape portion 357 is higher than a predetermined value, the tape tension adjusting pin 291 is slightly moved to the left under the tension in the magnetic tape portion 357 so that the tension adjusting arm 289 is angularly moved slightly in the clockwise direction about the pivot 288. As the tension adjusting arm 289 is angularly moved in the clockwise direction, the band 309 wrapped about the drum portion 147 of the reel mount 143 is loosened to reduce the load acting on the reel mount 143. Thus, the load acting on the magnetic tape portion 357 fed out of the supply reel within the tape cassette 72 is reduced so that the tension in the magnetic tape portion 357 is weakened. On the other hand, when the tension in the magnetic tape portion 357 is lower than the predetermined value, the tension adjusting pin 291 in sliding contact with the magnetic tape portion 357 running with the weak tension applied thereto is slightly moved to the left under the biasing force of the spring 294, so that the tension adjusting arm 289 is angularly moved in the counterclockwise direction about the pivot 288. As the tension adjusting arm 289 is angularly moved in this direction, the band 309 is strongly urged against the drum portion 147 of the reel mount 143 so that the load acting on the reel mount 143 is increased. This increases the load acting on the magnetic tape portion 357 fed out of the supply reel within the tape cassette 72. Thus, the tension in the magnetic tape portion 357 is strengthened. In this manner, the tension in the magnetic tape portion 357 is always maintained constant.

When the signal recording or reproducing is completed and a stop command is given to the apparatus, the apparatus is brought to the stop mode shown in FIG. 20d. If a command is further given for unloading the magnetic tape portion 357 and the tape cassette 72, the loading motor 243 is driven for rotation in the reverse direction to angularly move the drive gears 209 and 210 in their respective tape unloading directions. Accordingly, the movable blocks 189 and 190 are moved forwardly, i.e., toward their respective tape unloading positions. Thus, in the order reverse to that described above, the tape loading posts 196A and 196B, the inclined guide posts 199A and 199B, the pinch roller 273, the movable guide post 275 and the tension adjusting pin 291 are returned to their respective tape unloading positions. During this returning movement, the reel mount 143 is driven so that the magnetic tape portion 357 drawn out of the cassette case 356 is taken up about the supply reel within the tape cassette 72. Also, the slider 87 is moved forwardly by rotation of the tape cassette loading gear 250. Thus, at the point of time the gear teeth 212 on the drive gear 210 are brought out of mesh with the tape loading gear 248, unloading of the magnetic tape portion 357 is completed.

Subsequently, the rack gear teeth 88 on the slider 87 shown in FIG. 8 are brought into mesh with the main gear 94 to angularly move the gear 94 and the gear 95 in mesh therewith. The pivoting members 97 and 98 are pivotally moved in their respective directions D so that the follower pins 84 and 85 are moved respectively from the vertical sections 76B and 77B of the respective guide slots 76 and 77 to the horizontal sections 76A and 77A thereof. Thus, the tape cassette holder 80 and the tape cassette 72 are returned to the initial or tape cassette unloading position. The detector (not shown) detects the position of the tape cassette 72 and generates a signal when the tape cassette 72 is brought to the predetermined tape cassette unloading position. In response to the signal from the detector, the loading motor 243 stops in rotation. Thus, unloading of the tape cassette 72 is completed.

As described above, in the tape loading mechanism 188 of the magnetic recording and/or reproducing apparatus according to the invention, the loading post link 228 having one end thereof connected to the tape loading post 196A is connected at the other end to the drive gear 209 through the lost-motion mechanism which comprises the arcuate slot 214, the pin 230 and the torsion spring 235. Likewise, the loading post link 229 having one end thereof connected to the tape loading post 196B is connected at the other end to the drive gear 210 through the lost-motion mechanism which comprises the arcuate slot 220, the pin 231 and the torsion spring 236. The lost-motion mechanism associated with the drive gear 209 enables angular movement of the drive gear 209 in the tape loading direction to be transmitted to the tape loading post 196A through the loading post link 228 until the tape loading post 196A moves to the tape loading position. However, the lost-motion mechanism associated with the drive gear 209 prevents subsequent angular movement of the drive gear 209 in the tape loading direction after movement of the tape loading post 196A to the tape loading position, from being transmitted to the tape loading post 196A through the loading post link 228. Likewise, the lost-motion mechanism associated with the drive gear 210 enables angular movement of the drive gear 210 in the tape loading direction to be transmitted to the tape loading post 196B through the loading post link 229 until the tape loading post 196B moves to the tape loading position. However, the lost-motion mechanism associated with the drive gear 210 prevents subsequent angular movement of the drive gear 210 in the tape loading direction after movement of the tape loading post 196B to the tape loading position, from being transmitted to the tape loading post 196B through the loading post link 229. With such arrangement, the subsequent movement of the drive gears 209 and 210 after movement of the tape loading posts 196A and 196B to their respective tape loading positions, can be utilized to control movement of, for example, the pinch roller 273 and the tension adjusting pin 291. Thus, the drive gears 209 and 210 for driving the respective tape loading posts 196A and 196B can be used for various purposes.

Further, in the loading switching mechanism 242 of the magnetic recording and/or reproducing apparatus according to the invention, the tape loading gear 248 is in facing relation to the cut-out 223 in the drive gear 210 when the magnetic tape portion 357 is in the tape unloading position. As the tape loading gear 248 and the tape cassette loading gear 250 are angularly moved in their respective tape loading direction and tape cassette loading direction by the loading motor 243, and after the tape cassette loading gear 250 is angularly moved in the tape cassette loading direction through a predetermined angle to cause the slider 87 to move the tape cassette 72 to the tape cassette loading position, subsequent angular movement of the tape cassette loading gear 250 in the tape cassette loading direction causes the cam groove 259 to bring the engaging portion 262 of the lever 261 into engagement with the drive gear 210 to angularly move the same in the tape loading direction through a predetermined angle thereby bringing the gear teeth 212 on the drive gear 210 into mesh with the tape loading gear 248 to cause the same to angularly move the drive gear 210 in the tape loading direction. Thus, the loading switching mechanism 242 can move between the position where only the slider 87 can be moved linearly and the position where both the slider 87 and the drive gear 210 can be driven, making it possible to switch loading and unloading of the tape cassette 72 and loading and unloading of the magnetic tape portion 357. Moreover, it is possible to effect loading and unloading of the tape cassette 72 and the magnetic tape portion 357 by means of a single drive source, that is, the loading motor 243. Therefore, an attempt can be made to reduce the cost of the apparatus. In addition, the apparatus is improved in space factor, making it possible to reduce the overall size or dimension of the apparatus. Further, since loading and unloading of the tape cassette 72 and loading and unloading of the magnetic tape portion 357 are switched in a mechanical manner, the switching operation can be made reliable.

Figure 1:
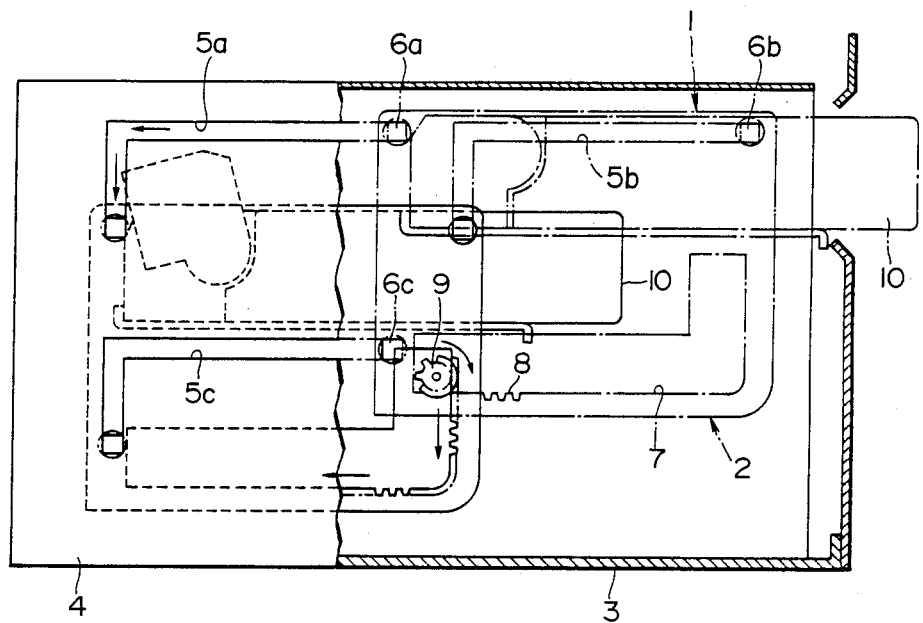
FIG. 1 is a partially broken away, fragmental side elevational view of a magnetic recording and/or reproducing apparatus of the prior art.
Figure 2:
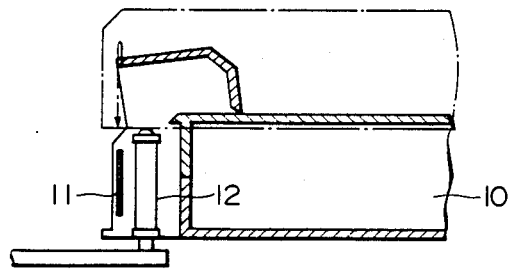
FIG. 2 is a fragmental cross-sectional view showing the positional relationship between a tape loading post and a tape cassette illustrated in FIG. 1, the tape cassette being in a tape cassette loading position.
Figure 3:
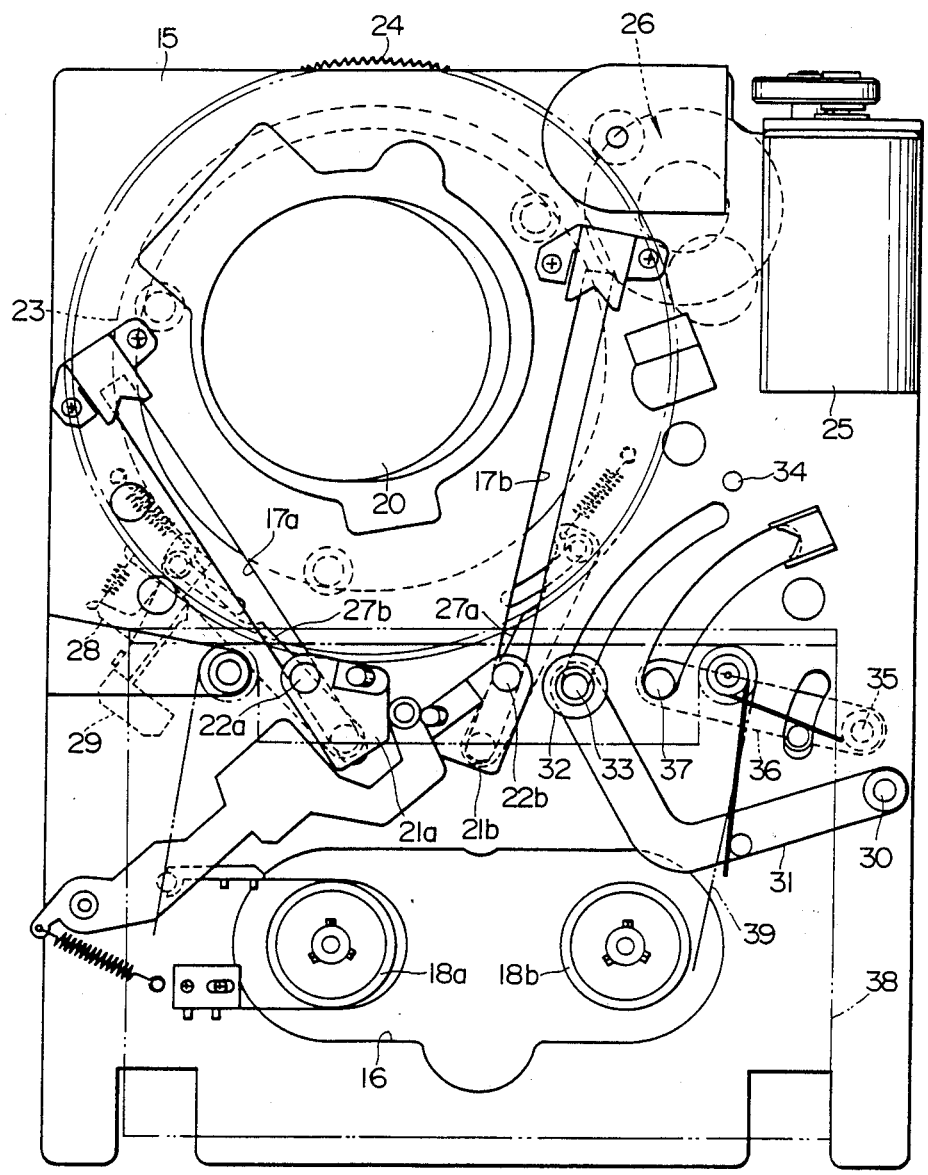
FIG. 3 is a top plan view of another magnetic recording and/or reproducing apparatus of the prior art, tape loading component parts being in their respective tape unloading positions.
Figure 4:
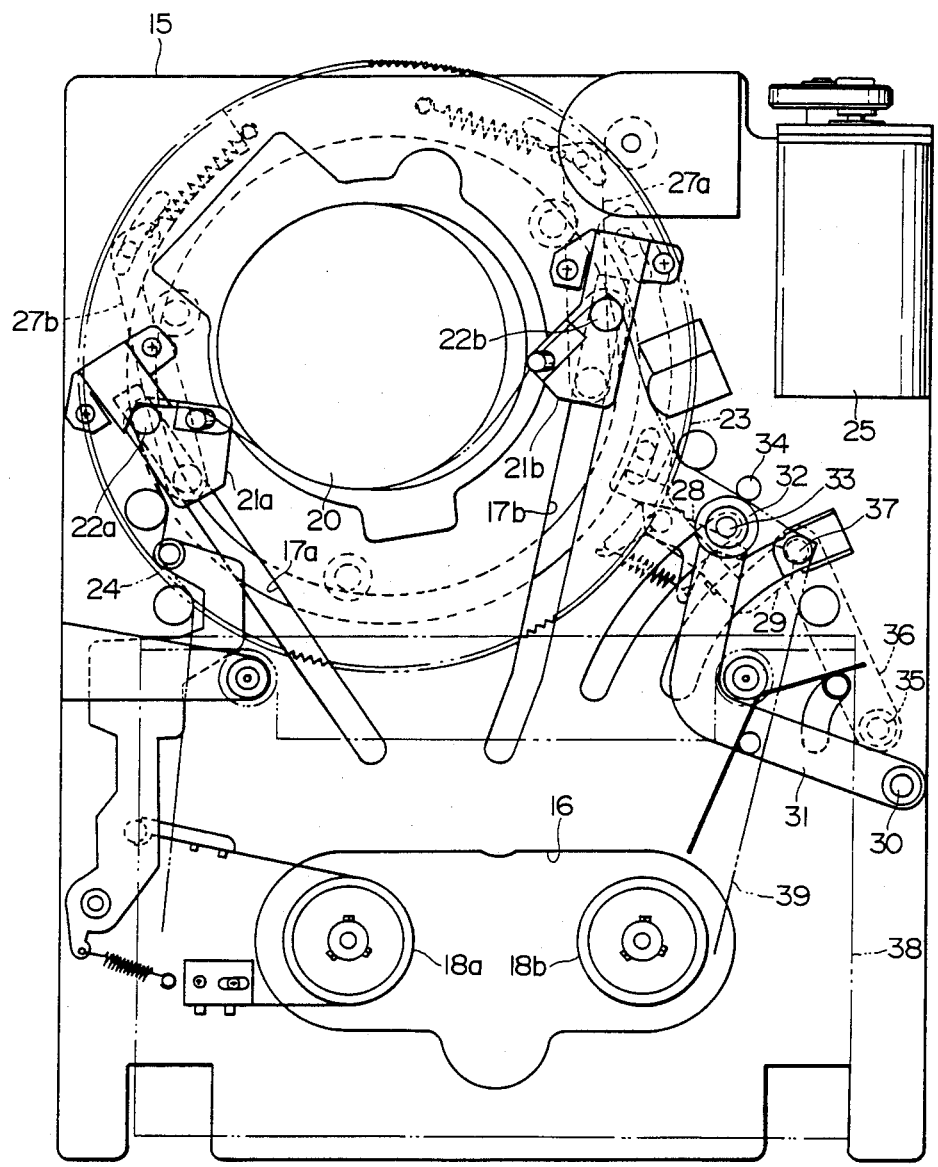
FIG. 4 is a view similar to FIG. 3, but showing that the tape loading component parts illustrated in FIG. 3 are moved to their respective tape loading positions.
Figure 5:
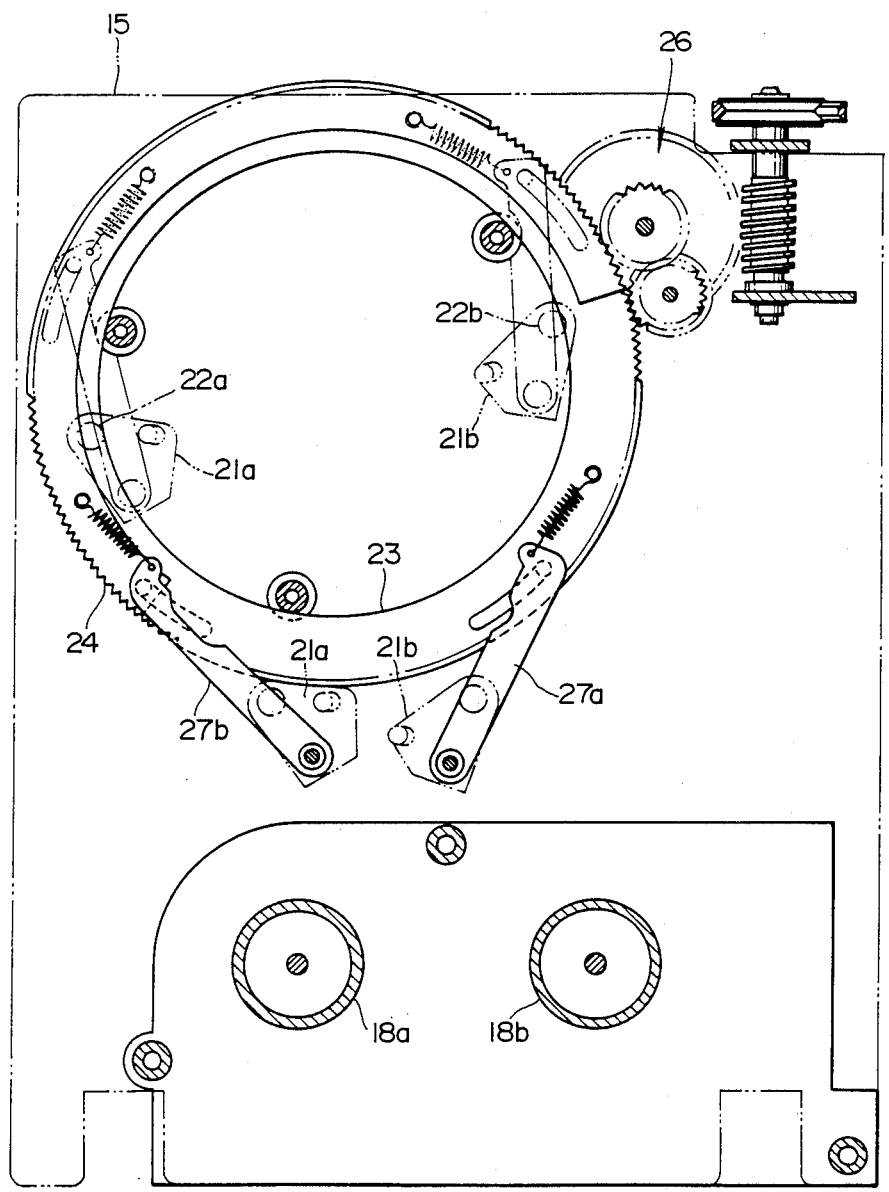
FIG. 5 is a horizontal cross-sectional view showing the tape loading component parts illustrated in FIGS. 3 and 4.
Figure 6:
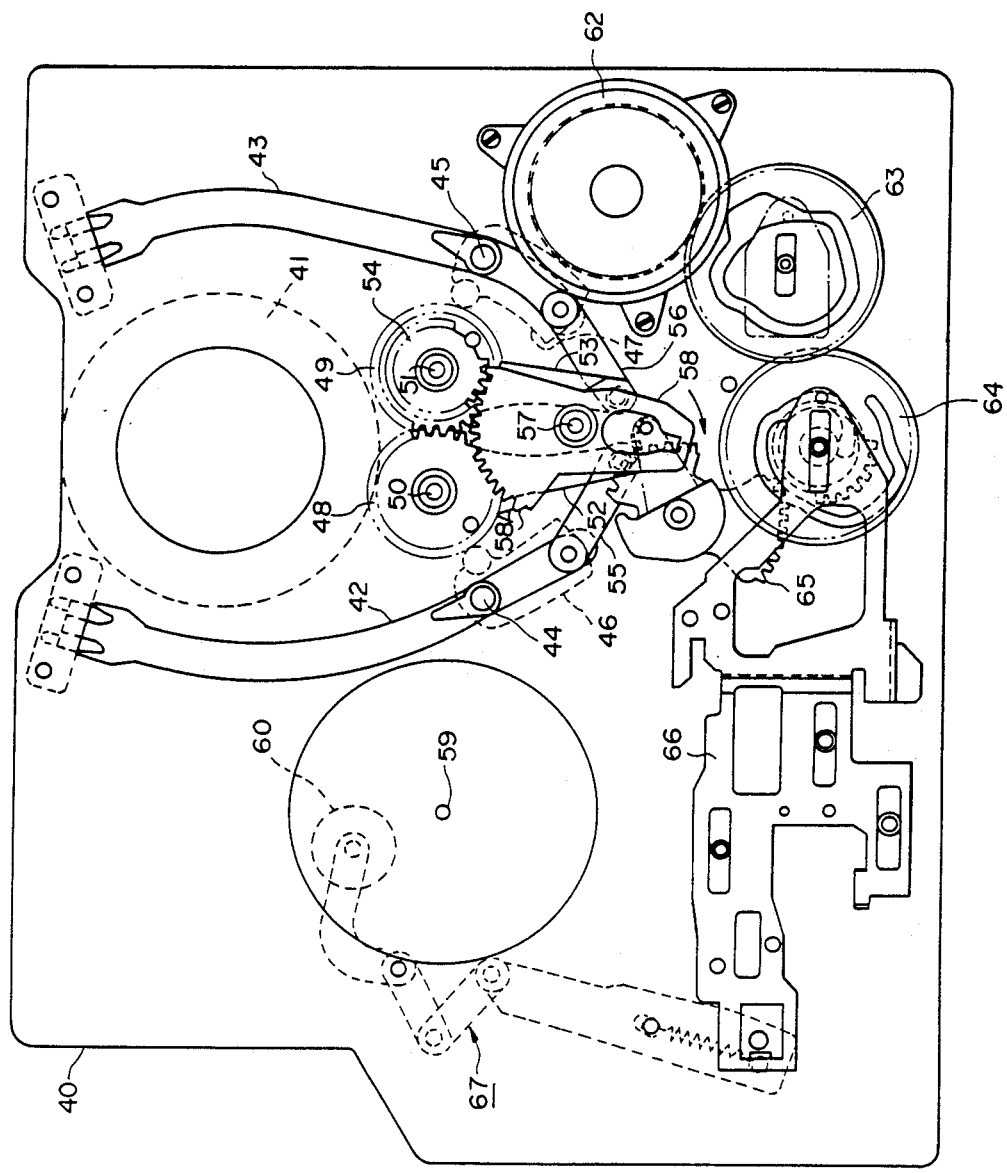
FIG. 6 is a bottom view of still another magnetic recording and/or reproducing apparatus of the prior art.

Furthermore, in the tape cassette loading mechanism 70 of the magnetic recording and/or reproducing apparatus according to the invention, each pair of pivoting members 97 and 98 associated with a corresponding one of the side walls 74 and 75 of the frame 71 are pivotally movable about the respective support shafts 91 and 92 in such a manner that, during pivotal movement of the pivoting members 97 and 98, their respective grooves 99 and 100 are maintained in crossing relation respectively to the guide slots 76 and 77 in the corresponding side wall. The arcuate link 102 has its opposite ends pivotally connected respectively to the pivoting members 97 and 98 to enable them to pivotally move in parallel relation to each other. Thus, in spite of provision of only the two guide slots 97 and 98 in each of the side walls 74 and 75, it is possible to smoothly move the tape cassette holder 80 between the tape cassette unloading and loading positions, without the follower pins 84 and 85 being caught in the respective guide slots 97 and 98. Moreover, because of only the two guide slots 97 and 98 in each of the side walls 74 and 75, it is possible to reduce the size in height of the apparatus. Further, since the pivoting members 97 and 98 are connected to each other by the link 102, the driving force is transmitted to the follower pins 84 and 85 through the respective pivoting members 97 and 98. Accordingly, movement of the follower pins 84 and 85 can be made smooth, as compared with the arrangement in which driving force is transmitted from a single location where the pinion is in mesh with the rack gear teeth on the rack plate, to the three follower pins, as illustrated in FIGS. 1 and 2. In addition, provision of only the two guide slots 97 and 98 in each of the side walls 74 and 75 facilitates the assembling operation, because insertion of the two follower pins 97 and 98 into the respective guide slots 76 and 77 suffices.

What is claimed is:

1. A magnetic recording and/or reproducing apparatus for use with a tape cassette having accommodated therein a magnetic tape, said apparatus comprising:

a head drum having mounted thereon at least one magnetic head;

tape cassette loading means including a slider mounted for linear movement in tape cassette loading and unloading directions opposite to each other, said slider being formed thereon with rack gear teeth, linear movement of said slider in said tape cassette loading and unloading directions moving said tape cassette between a tape cassette loading position where said tape cassette is located at a predetermined position with respect to said head drum and a tape cassette unloading position where said tape cassette can be unloaded from the apparatus;

tape loading means including drive gear means mounted for angular movement about its axis in tape loading and unloading directions opposite to each other, said drive gear means being provided in an outer periphery thereof with a cut-out at which gear teeth on said drive gear means are partially cut out, angular movement of said drive gear means in its tape loading and unloading directions moving a portion of the magnetic tape between a tape unloading position where the magnetic tape portion extends within said tape cassette and a tape loading position where the magnetic tape portion is wrapped about said head drum by a predetermined wrapping angle;

tape loading gear means mounted for angular movement about its axis in tape loading and unloading directions opposite to each other, said tape loading gear means being arranged in facing relation to said cut-out in said drive gear means when the magnetic tape portion is in its tape unloading position;

tape cassette loading gear means mounted for angular movement about its axis in tape cassette loading and unloading directions opposite to each other, said tape cassette loading gear means being in mesh with said rack gear teeth on said slider for linearly moving the same in its tape cassette loading and unloading directions, said tape cassette loading gear means being provided on an end face thereof with cam means;

drive means for driving said tape loading gear means and said tape cassette loading gear means to angularly move them in their respective tape loading and unloading directions and tape cassette loading and unloading directions; and cam follower means having one end thereof in engagement with said cam means and the other end engageable with said drive gear means, wherein as said tape loading gear means and said tape cassette loading gear means are angularly moved in their respective tape loading direction and tape cassette loading direction by said drive means, after said tape cassette loading gear means is angularly moved in its tape cassette loading direction through a predetermined angle to cause said slider to move said tape cassette to its tape cassette loading position, subsequent angular movement of said tape cassette loading gear means in its tape cassette loading direction causes said cam means to bring the other end of said cam follower means into engagement with said drive gear means to angularly move the same in its tape loading direction through a predetermined angle thereby bringing the gear teeth on said drive gear means into mesh with said tape loading gear means to cause the same to angularly move said drive gear means in its tape loading direction.

2. A magnetic recording and/or reproducing apparatus as defined in claim 1, wherein said drive gear means is provided on an end face thereof with an engaging wall with which the other end of said cam follower means is engageable.

3. A magnetic recording and/or reproducing apparatus as defined in claim 1, wherein said cam follower means comprises a generally L-shaped lever supported at its intermediate portion for pivotal movement.

4. A magnetic recording and/or reproducing apparatus as defined in claim 1, wherein said cam means comprises a cam groove formed in the end face of said tape cassette loading gear means, and said cam follower means having at its one end a pin fitted in said cam groove for movement therealong.

5. A magnetic recording and/or reproducing apparatus as defined in claim 1, wherein said tape loading gear means is in meshing relation to said tape cassette loading gear means through intermediate gear means, and said drive means is drivingly connected to said tape loading gear means for angularly moving the same to drive said tape cassette loading gear means through said intermediate gear means.

6. A magnetic recording and/or reproducing apparatus as defined in claim 1, wherein said drive gear means of said tape loading means comprises a pair of first and second drive gear being in mesh with each other, said first drive gear being provided in an outer periphery with said cut-out 7. A magnetic recording and/or reproducing apparatus as defined in claim 6, wherein said tape loading means includes;

a pair of first and second tape loading posts movable between their respective tape unloading positions where said first and second tape loading posts are located within said tape cassette and respective tape loading positions where said first and second tape loading posts are located remote from said tape cassette, the magnetic tape portion occupying its tape unloading and loading positions respectively when said first and second tape loading posts occupy their respective tape unloading positions and when said first and second tape loading posts occupy their respective tape loading positions;

a pair of first and second loading post links having their respective one ends connected respectively to said first and second tape loading posts, said first loading post link extending between said first tape loading post and said first drive gear for transmitting angular movement of said first drive gear to said first tape loading post to move the same between its tape unloading and loading positions, said second loading post link extending between said second tape loading post and said second drive gear for transmitting angular movement of said second drive gear to said second tape loading post to move the same between its tape unloading and loading positions; and a pair of first and second lost-motion means through which the other ends of the respective first and second loading post links are connected respectively to said first and second drive gears, wherein said first lost-motion means enables angular movement of said first drive gear in its tape loading direction to be transmitted to said first tape loading post through said first loading post link until said first tape loading post moves to its tape loading position, while said first lost-motion means prevents subsequent angular movement of said first drive gear in its tape loading direction after movement of said first tape loading post to its tape loading position, from being transmitted to said first tape loading post through said first loading post link, and wherein said second lost-motion means enables angular movement of said second drive gear in its tape loading direction to be transmitted to said second tape loading post through said second loading post link until said second tape loading post moves to its tape loading position, while said second lost-motion means prevents subsequent angular movement of said second drive gear in its tape loading direction after movement of said second tape loading post to its tape loading position, from being transmitted to said second tape loading post through said second loading post link.

8. A magnetic recording and/or reproducing apparatus as defined in claim 7, wherein each of said first and second lost-motion means comprises an arcuate slot formed in a corresponding one of said first and second drive gears, said arcuate slot extending circumferentially about the axis of the corresponding drive gear, a pin fitted in said arcuate slot for movement therealong and mounted to the other end of a corresponding one of said first and second loading post links, and biasing means associated with said pin for biasing the same in such a direction as to move a corresponding one of said first and second tape loading posts toward its tape loading position.

9. A magnetic recording and/or reproducing apparatus as defined in claim 1, wherein said tape cassette loading means includes:

a pair of first and second fixed side walls arranged in parallel spaced relation to each other, each of said first and second fixed side walls having associated therewith a pair of guide rails extending in parallel relation to each other, each of said guide rails having a first section extending substantially horizontally and a second section continuous to said first section and extending downwardly from said first section at an angle with respect thereto;

a tape cassette holder for holding thereon said tape cassette and arranged between said first and second fixed side walls for movement relative thereto between said tape cassette loading and unloading positions of said tape cassette, said tape cassette holder having first and second pairs of follower projections, said first pair of follower projections being movable respectively along said pair of guide rails associated with said first fixed side wall, and said second pair of follower projections being movable respectively along said pair of guide rails associated with said second fixed side wall;

first and second pairs of pivoting members pivotally mounted respectively to said first and second fixed side walls, said first pair of pivoting members being provided therein with respective grooves in which said first pair of follower projections are slidably fitted respectively, and said second pair of pivoting members being provided therein with respective grooves in which said second pair of follower projections are slidably fitted respectively, said first pair of pivoting members being pivotally movable about their respective pivotal axes in such a manner that, during pivotal movement of said first pair of pivoting members, their respective grooves are maintained in crossing relation respectively to said pair of guide rails associated with said first fixed side wall, and said second pair of pivoting members being pivotally movable about their respective pivotal axes in such a manner that, during pivotal movement of said second pair of pivoting members, their respective grooves are maintained in crossing relation respectively to said pair of guide rails associated with said second fixed side wall;

a pair of first and second connecting links, said first connecting link having opposite ends thereof pivotally connected respectively to said first pair of pivoting members to enable them to pivotally move in parallel relation to each other, and said second connecting link having opposite ends thereof pivotally connected respectively to said second pair of pivoting members to enable them to pivotally move in parallel relation to each other; and means for transmitting linear movement of said slider in its tape cassette loading and unloading directions to said first and second pairs of pivoting members to pivotally move them for moving said first and second pairs of follower projections respectively along the pairs of guide rails associated respectively with said first and second fixed side walls, thereby moving said tape cassette holder between said tape cassette loading and unloading positions of said tape cassette.

* * * * *